US008396805B2

(12) United States Patent
Adachi et al.

(10) Patent No.: US 8,396,805 B2
(45) Date of Patent: Mar. 12, 2013

(54) MANAGEMENT APPARATUS, INFORMATION PROCESSING APPARATUS, MANAGEMENT METHOD, AND INFORMATION PROCESSING METHOD

(75) Inventors: Seiichi Adachi, Kanagawa (JP); Yoji Kawamoto, Tokyo (JP); Motomasa Futagami, Kanagawa (JP); Atsushi Nakamura, Tokyo (JP); Mitsuhiro Nakamura, Tokyo (JP)

(73) Assignee: Sony Corporation, Tokyo (JP)

( * ) Notice: Subject to any disclaimer, the term of this patent is extended or adjusted under 35 U.S.C. 154(b) by 929 days.

(21) Appl. No.: 11/741,263

(22) Filed: Apr. 27, 2007

(65) Prior Publication Data
US 2007/0288386 A1 Dec. 13, 2007

(30) Foreign Application Priority Data
May 22, 2006 (JP) .................................. 2006-142028

(51) Int. Cl.
*G06Q 30/00* (2012.01)
*G06F 21/00* (2006.01)
(52) U.S. Cl. .......................................... 705/59; 705/58
(58) Field of Classification Search .............. 705/50–51, 705/58–59
See application file for complete search history.

(56) References Cited

U.S. PATENT DOCUMENTS
8,156,049 B2 * 4/2012 Mahlbacher .................... 705/57
2006/0095382 A1 * 5/2006 Mahlbacher .................... 705/59

FOREIGN PATENT DOCUMENTS
EP 1 158 416 A1 11/2001
JP 2001-215974 8/2001
WO WO2006/043784 A1 * 4/2006

OTHER PUBLICATIONS

DRM Specification, Open Mobile Alliance, OMA-TS-DRM-DRM-V2_0-20050908-C, 154 pages, Sep. 8, 2005.*
DRM Specification Candidate Version 2.0—Sep. 8, 2005 (DRM Specification, Open Mobile Alliance, OMA-TS-DRM-DRM-V2_0-20050908-C, 154 pages, Sep. 8, 2005, hereinafter referred to as DRM).*
Touimi et al. ("Enhanced Security Architecture for Music Distribution on Mobile", ESORICS 2006, LNCS 4189, pp. 97-109 © Springer-Verlag Berlin Heidelberg 2006).*
DRM Speciification Candidate Version 2.0—Sep. 8, 2005 (DRM Specification, Open Mobile Alliance, OMA-TS-DRM-DRM-V2_0-20050908-C, 154 pages, Sep. 8, 2005).*
U.S. Appl. No. 11/742,076, filed Apr. 30, 2007, Nakamura, et al.

* cited by examiner

*Primary Examiner* — James D Nigh
(74) *Attorney, Agent, or Firm* — Oblon, Spivak, McClelland, Maier & Neustadt, L.L.P.

(57) ABSTRACT

A management apparatus includes a registering unit configured to issue a first key corresponding to a first service in response to a request for registration with the first service from a first information processing apparatus; a storage unit configured to store an apparatus ID of the first information processing apparatus, the first key, and a second key corresponding to a second service while associating the apparatus ID, the first key, and the second key with each other; and a composite license issuing unit configured to issue a composite license including a first license and a second license, the first license including first encrypted data, which is a content key that is used to decrypt the encrypted content and that is encrypted with the first key, and the second license including second encrypted data, which is the content key that is encrypted with the second key.

16 Claims, 24 Drawing Sheets

FIG. 5

| USER ID | USER KEY | | APPARATUS ID | |
| --- | --- | --- | --- | --- |
| | FOR APPARATUS CORRESPONDING TO DRM-A | FOR APPARATUS CORRESPONDING TO DRM-B | APPARATUS CORRESPONDING TO DRM-A | APPARATUS CORRESPONDING TO DRM-B |
| Yamada | USER KEY A1 | USER KEY B1 | A001 | B001 |
| Shinagawa | USER KEY A2 | USER KEY B2 | A002 | B002 |
| | | | A003 | B003 |

FIG. 13

| USER ID | MAXIMUM NUMBER OF APPARATUSES TO WHICH USER KEY IS ISSUED | | | |
|---|---|---|---|---|
| | FIRST USER KEY A | SECOND USER KEY A | FIRST USER KEY B | SECOND USER KEY B |
| Yamada | 1 | 1 | 2 | 1 |
| Shinagawa | 1 | 0 | 1 | 2 |
| | | | | |

FIG. 19

| CORRESPONDING EXISTING DRM SERVICE | GROUP LICENSE | GROUP KEY |
|---|---|---|
| DRM-C | GROUP LICENSE C | GROUP KEY C |
| DRM-D | GROUP LICENSE D | GROUP KEY D |
|  |  |  |

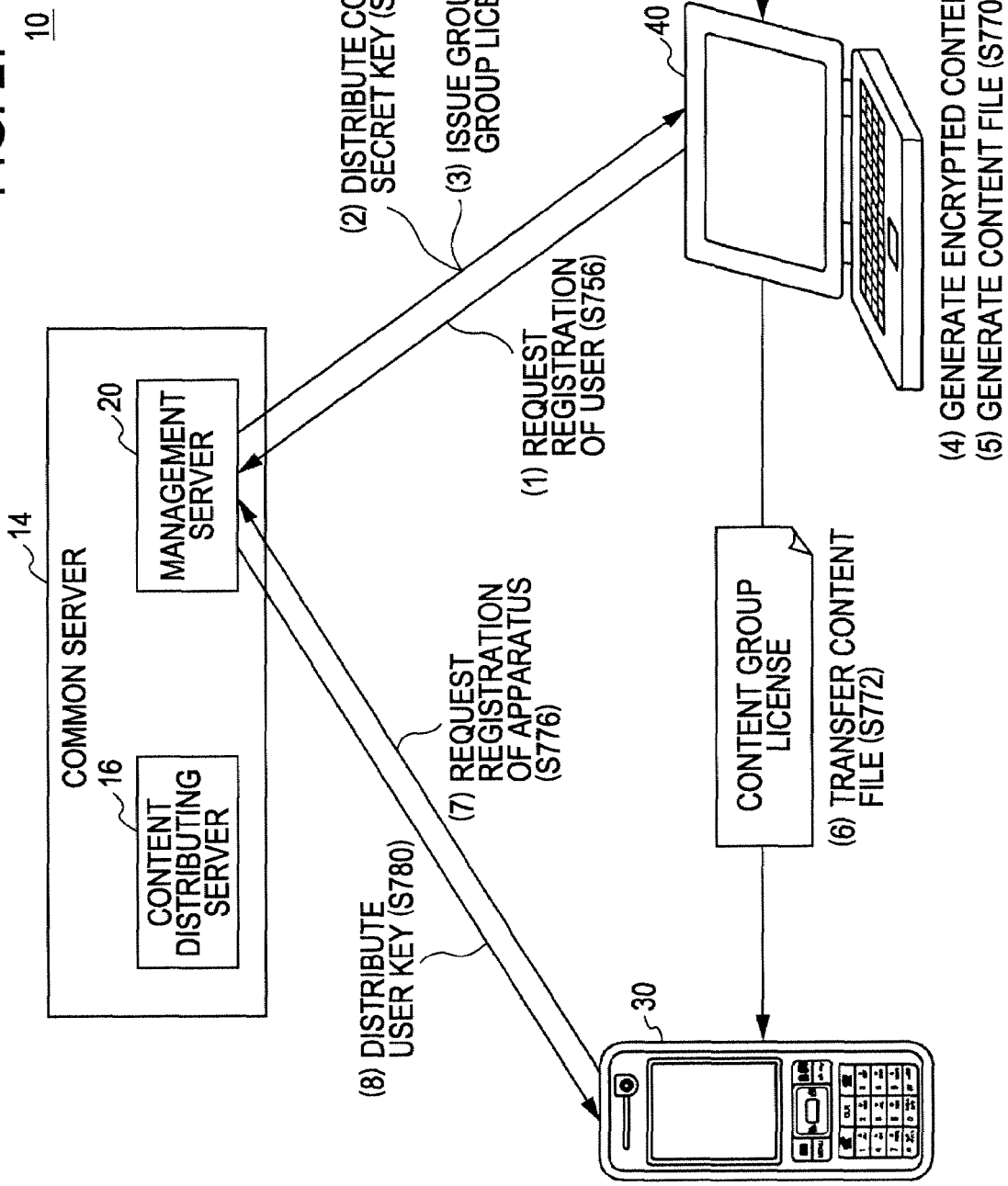

MANAGEMENT APPARATUS, INFORMATION PROCESSING APPARATUS, MANAGEMENT METHOD, AND INFORMATION PROCESSING METHOD

CROSS REFERENCES TO RELATED APPLICATIONS

The present invention contains subject matter related to Japanese Patent Application JP 2006-142028 filed in the Japanese Patent Office on May 22, 2006, the entire contents of which are incorporated herein by reference.

BACKGROUND OF THE INVENTION

1. Field of the Invention

The present invention relates to a management apparatus, an information processing apparatus, a management method, and an information processing method configured to protect a copyright of content.

2. Description of the Related Art

In recent years, there has been provided a service of distributing digital content such as music content and video content (hereinafter referred to as content) from a server storing the content to information processing apparatuses owned by a user, such as a PC (personal computer) and a mobile phone. Even if the content is copied or is transmitted many times, the quality thereof is not degraded. Under these circumstances, a copyright protecting technique to restrict the use of content has been receiving attention.

As the copyright protecting technique, the following method can be used. That is, a server distributes encrypted content and a license including a content key to decrypt the content to an information processing apparatus at the same time or separately, so that the content can be used only by the information processing apparatus having the license.

Note that, since the copyright protecting technique applied to a PC is different from that applied to a mobile phone, there is no compatibility between a license for a PC and a license for a mobile phone. Therefore, when content usable in a PC is transferred to a mobile phone so as to be used in the mobile phone, a new license for the mobile phone is issued to the mobile phone. The issue of the license for the mobile phone has conventionally been performed by converting the license for the PC to the license for the mobile phone in a securely protected unit of the PC (see Patent Document 1: Japanese Unexamined Patent Application Publication No. 2001-215974).

SUMMARY OF THE INVENTION

However, in the conventional license converting process performed in a PC, the PC needs to include a securely protected unit so that conversion of an illegal license can be prevented. Furthermore, it is not preferable that a privately owned PC performs a process equivalent to that performed by a server issuing a license.

The present invention has been made in view of the above-described problems, and is directed to providing novel and improved management apparatus, information processing apparatus, management method, and information processing method capable of realizing sharing of content among information processing apparatuses to which different copyright protecting techniques are applied without requiring a license converting process by the information processing apparatus.

According to an embodiment of the present invention, there is provided a management apparatus to provide a license to use encrypted content to an information processing apparatus. The management apparatus includes a registering unit configured to issue a first key corresponding to a first service in response to a request for registration with the first service from a first information processing apparatus; a storage unit configured to store an apparatus ID of the first information processing apparatus, the first key, and a second key corresponding to a second service while associating the apparatus ID, the first key, and the second key with each other; and a composite license issuing unit configured to issue a composite license including a first license and a second license, the first license including first encrypted data, which is a content key that is used to decrypt the encrypted content and that is encrypted with the first key, and the second license including second encrypted data, which is the content key that is encrypted with the second key.

According to the management apparatus having the above-described configuration, when issuing a license to the first information processing apparatus, the management apparatus issues the composite license including the first license generated on the basis of the first key issued to the first information processing apparatus and the second license generated on the basis of the second key stored in the storage unit while being associated with the first key. Accordingly, in the first information processing apparatus, the content key included in the first license in the composite license can be decrypted with the first key and the content can be used by using the decrypted content key. Furthermore, the second information processing apparatus corresponding to the second license included in the composite license can use the content on the basis of the second license in the composite license only by receiving the composite license from the first information processing apparatus. That is, the management apparatus can realize sharing of content among a plurality of information processing apparatuses without requiring a license converting process by the information processing apparatus.

The first key may be a first user key that is given to a group of one or more first information processing apparatuses corresponding to the first service owned by the same user who is registered, the first key being given in units of users.

With this configuration, the first user key as the same first key is issued to the first information processing apparatuses that are registered in the group of information processing apparatuses owned by the same user. Accordingly, in the first information processing apparatuses registered in the group, the first license included in the composite license issued by the management apparatus can be shared, the content key included in the first license can be decrypted with the first key, and the content can be used on the basis of the decrypted content key.

The storage unit may further store a user ID of the user owning the first information processing apparatus while associating the user ID. If the registering unit receives a request for registration of an apparatus to a group of a specific user from a second information processing apparatus corresponding to the second service, the registering unit may issue the second key that is stored in the storage unit while being associated with a user ID of the specific user.

With this configuration, the composite license that is issued at the time when the second information processing apparatus is not registered in the group of the user owning the first information processing apparatus can be used in the second information processing apparatus that is registered in the group later. More specifically, the management apparatus stores the second key, which is issued after the second information processing apparatus has been registered in the group, in the storage unit even if the second information processing apparatus has not been registered, and issues the composite license including the second license generated on the basis of the second key upon receiving a request for issuing the composite license from the first information processing apparatus. If the second information processing apparatus receives the composite license from the first information processing apparatus, the second information processing apparatus requests registration of the apparatus in the group of the user owning the first information processing apparatus stored in the storage unit of the management apparatus, so that the second information processing apparatus can receive the second key that is stored in advance while being associated with the user. Therefore, in the second information processing apparatus, the content key included in the second license in the composite license can be decrypted by using the second key, and the content can be used on the basis of the content key.

The first license may further include a usage condition of content encrypted with the first key, and the second license may further include a usage condition of content encrypted with the second key. With this configuration, the usage condition of content included in the first license can be decrypted only by a user having the first key, and the usage condition of content included in the second license can be decrypted only by a user having the second key. Accordingly, when the management apparatus issues the composite license to an information processing apparatus or when the composite license is transmitted/received between information processing apparatuses, tapping of the usage condition by a third party can be prevented and the confidentiality of the usage condition can be secured.

If the composite license issuing unit changes a usage condition of the first license included in the composite license, the composite license issuing unit may also change a usage condition of the second license in accordance with the change. With this configuration, if the composite license issuing unit receives a request for changing the usage condition of one of the licenses included in the composite license from an information processing apparatus, the composite license issuing units transmits data to change the usage condition of the other license to the information processing apparatus. Accordingly, the information processing apparatus received the data rewrites the usage condition of each license included in the composite license on the basis of the data. Thus, the number of times of access to the management apparatus performed by the information processing apparatus to change the usage condition of each license can be minimized.

The management apparatus may further include a group license issuing unit configured to issue a group key and a group license, the group key being used to transfer encrypted content that is stored in the information processing apparatus and that is based on a specific service corresponding to the information processing apparatus to another information processing apparatus not corresponding to the specific service in response to a request from the information processing apparatus, and the group license including the group key encrypted so as to be decrypted in the information processing apparatus on the transferred side.

The management apparatus having the above-described configuration issues the group key and the group license used to transfer content that is purchased by the information processing apparatus from an existing server. More specifically, the group key is used to encrypt the content item key that is generated by the information processing apparatus to encrypt each piece of content. The group key is included in the group license and is encrypted with the first key or the second key corresponding to the information processing apparatus on the transferred side. If the information processing apparatus transfers the group license and the content item key together with the content purchased from the existing server, the information processing apparatus on the transferred side can use the content.

The group key and/or the group license may be issued in units of services corresponding to the information processing apparatus and/or content. With this configuration, the group key is issued for all pieces of content purchased by one information processing apparatus from the existing server or for each service corresponding to the pieces of content that is purchased from the existing server and that is to be transferred from the information processing apparatus. Likewise, the group license is issued for all pieces of content purchased by one information processing apparatus from the existing server or for each service corresponding to the pieces of content that is purchased from the existing server and that is to be transferred from the information processing apparatus.

By issuing the group key and the group license for each service corresponding to the information processing apparatus and content, damage of tapping can be suppressed to a predetermined range even if part of the group key and the group license is intercepted by a third party.

According to another embodiment of the present invention, there is provided an information processing apparatus including a storage unit configured to store a first key or a second key corresponding to a first service or a second service, the first and second keys being issued by a management apparatus, and a composite license including a first license and a second license, the first license including first encrypted data, which is a content key that is used to decrypt encrypted content and that is encrypted with the first key, and the second license including second encrypted data, which is the content key that is encrypted with the second key; and a content using unit configured to decrypt the encrypted content with the content key included in the first license or the second license corresponding to the information processing apparatus among the first license and the second license included in the composite license stored in the storage unit and use the decrypted content.

The information processing apparatus having the above-described configuration reads the composite license corresponding to the content from the storage unit when using the content. Furthermore, the information processing apparatus determines whether the composite license includes a license having a content key that can be decrypted on the basis of the first key or the second key stored in the information processing apparatus. If the desired license is included in the composite license, the content can be used on the basis of the license.

The information processing apparatus may further include a usage control unit configured to determine whether the composite license stored in the storage unit includes the first license or the second license corresponding to the information processing apparatus. With this configuration, the usage control unit can determine whether the composite license stored in the storage unit includes the first license or the second license having a content key that can be decrypted on the basis of the first key or the second key owned by the information processing apparatus.

The storage unit may further store a group key and a group license, the group key being used to transfer content of a specific service stored in the storage unit to another information processing apparatus not corresponding to the specific service, and the group license including the group key encrypted so as to be decrypted in the information processing apparatus on the transferred side. The information processing apparatus may further include an encrypting unit configured to encrypt each piece of the content of the specific service with a predetermined content item key and encrypt the content item key with the group key; and a transferring unit configured to transfer the encrypted content, the content item key, and the group license.

With this configuration, before transferring content of a specific service to another information processing apparatus, the information processing apparatus encrypts the content with a predetermined content item key, and then encrypts the content item key with the group key stored in the storage unit. Then, the information processing apparatus transfers the encrypted content item key and group license together with the encrypted content.

The storage unit may further store the encrypted content transferred from another information processing apparatus, the content item key, and the group license. The information processing apparatus may further include a usage control unit configured to determine whether the content item key can be used on the basis of whether the group license includes the group key that can be decrypted with the first or second key owned by the information processing apparatus.

With this configuration, the information processing apparatus receives the transferred encrypted content together with the group license and the content item key corresponding to the information processing apparatus, and stores them in the storage unit. Then, the information processing apparatus decrypts the group key included in the group license with the first or second key owned by the information processing apparatus, decrypts the content item key with the group key, and uses the encrypted content on the basis of the content item key.

According to another embodiment of the present invention, there is provided a management method for providing a license to use encrypted content to an information processing apparatus. The management method includes the steps of: issuing a first key corresponding to a first service in accordance with a request for registration with the first service from a first information processing apparatus; storing an apparatus ID of the first information processing apparatus, the first key, and a second key corresponding to a second service while associating the apparatus ID, the first key, and the second key with each other; and issuing a composite license including a first license and a second license, the first license including first encrypted data, which is a content key that is used to decrypt the encrypted content and that is encrypted with the first key, and the second license including second encrypted data, which is the content key that is encrypted with the second key.

According to the management method including the above-described steps, when a license is issued to the first information processing apparatus, the composite license including the first license generated on the basis of the first key issued to the first information processing apparatus and the second license generated on the basis of the second key stored while being associated with the first key is issued. Accordingly, in the first information processing apparatus, the content key included in the first license in the composite license can be decrypted with the first key and the content can be used by using the decrypted content key. Furthermore, the second information processing apparatus corresponding to the second license included in the composite license can use the content on the basis of the second license only by receiving the composite license from the first information processing apparatus. That is, the management method can realize sharing of content among a plurality of information processing apparatuses without requiring a license converting process by the information processing apparatus.

According to another embodiment of the present invention, there is provided an information processing method comprising the steps of: storing, in a storage unit, a first key or a second key corresponding to a first service or a second service, the first and second keys being issued by a management apparatus, and a composite license including a first license and a second license, the first license including first encrypted data, which is a content key that is used to decrypt encrypted content and that is encrypted with the first key, and the second license including second encrypted data, which is the content key that is encrypted with the second key; and decrypting the encrypted content with the content key included in the first license or the second license corresponding to the own information processing apparatus among the first license and the second license included in the composite license stored in the storage unit and using the decrypted content.

According to the information processing method including the above-described steps, the composite license corresponding to the content is read from the storage unit when using the content. Furthermore, it is determined whether the composite license includes a license having a content key that can be decrypted on the basis of the first key or the second key stored in the information processing apparatus. If the desired license is included in the composite license, the content can be used on the basis of the license.

As described above, according to the embodiments of the present invention, content can be shared among a plurality of information processing apparatuses to which different copyright protecting techniques are applied without requiring a license converting process by the information processing apparatus.

BRIEF DESCRIPTION OF THE DRAWINGS

FIG. 5 is an illustration of a table configuration of data stored in a storage unit according to the first embodiment;

FIG. 13 is an illustration of an example of a maximum number of apparatuses to which a user key is issued according to the first embodiment;

FIG. 19 is an illustration of a state where group licenses are issued by a group license issuing unit according to the second embodiment;

FIG. 27 is an illustration showing the process performed in the content sharing system according to the second embodiment.

DESCRIPTION OF THE PREFERRED EMBODIMENTS

Figure 1:
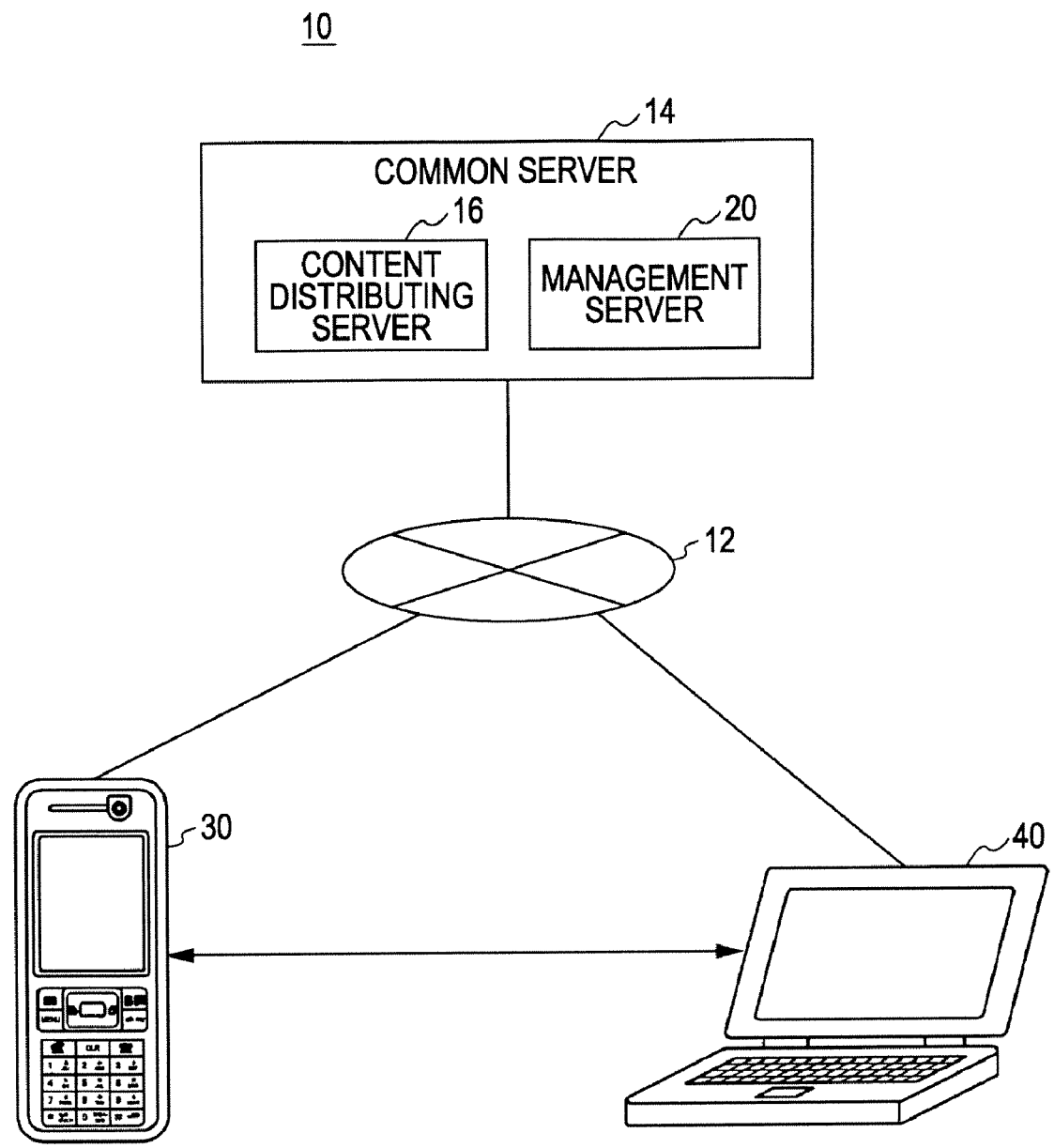
FIG. 1 is an illustration of a content sharing system according to a first embodiment of the present invention.

Hereinafter, preferred embodiments of the present invention are described in detail with reference to the attached drawings. In this specification and the drawings, elements having substantially the same function or configuration are denoted by the same reference numerals and duplicate description is not made.

First Embodiment

First, a content sharing system 10 according to a first embodiment of the present invention is briefly described.

FIG. 1 is an illustration showing the content sharing system 10 according to the first embodiment. The content sharing system 10 includes a communication network 12, a common server 14, a mobile phone 30, and a PC (personal computer) 40.

The communication network 12 is a wired or wireless electric communication medium to transmit/receive encrypted content (described below) and various data such as a license between the common server 14 and the mobile phone 30 and the PC 40. Transmission/reception of the encrypted content and various data such as a license between the mobile phone 30 and the PC 40 may also be performed via the communication network 12.

The common server 14 includes a content distributing server 16 and a management server 20. The content distributing server 16 distributes encrypted content to the mobile phone 30 and the PC 40 via the communication network 12 in response to requests from the mobile phone 30 and the PC 40. The content includes music data of songs, lectures, and radio programs; video data of movies, television programs, video programs, photos, pictures, and figures; and other arbitrary data of games and software.

The management server 20 registers one or more information processing apparatuses owned by the same user in a group. Also, the management server 20 issues a license allowing the use of encrypted content distributed by the content distributing server 16 in response to a request from the information processing apparatus registered in the group. Herein, "issue" means generating and/or transmitting a subject.

More specifically, the license includes a content key to decrypt the encrypted content and a usage condition to restrict the use of the content. The format of such a license varies depending on a DRM (digital rights management) service. In this specification, the DRM service corresponding to the mobile phone 30 is called DRM-A (first service), the license based on DRM-A is called license A (first license), and a user key based on DRM-A is called user key A (first key). Note that, if the applied copyright protecting technique varies, the type of DRM service managed by the copyright protecting technique also varies.

On the other hand, the DRM service corresponding to the PC 40 is called DRM-B (second service), the license based on DRM-B is called license B (second license), and a user key based on DRM-B is called user key B (second key).

Diversified usage patterns can be applied in accordance with the above-described types of content. For example, music content can be played back, exported, copied, or backed up. Video content can be reproduced, exported, copied, displayed, or printed. Herein, "export" means generating a license based on a copyright protecting technique on the basis of a license based on another copyright protecting technique.

Thus, the above-described usage condition written in the license can restrict the number of times of reproducing or export of content, the total time of reproducing or the total number of pages that can be printed, and a period when the content can be used.

The mobile phone 30 and the PC 40 serving as an information processing apparatus can use encrypted content distributed from the content distributing server 16 on the basis of a license issued by the management server 20. Also, the mobile phone 30 and the PC 40 according to this embodiment are registered as a group of information processing apparatuses owned by the same user and can share content and a license via the communication network 12 or a line. Hereinafter, the mobile phone 30 and the PC 40 are collectively referred to as information processing apparatuses when they need not be distinguished from each other.

Although the mobile phone 30 and the PC 40 are shown as the information processing apparatuses in FIG. 1, a game machine, a mobile music player, and a mobile video reproducing apparatus may be used as the information processing apparatuses. An example of the DRM service corresponding to the mobile phone 30 is OMA (open mobile alliance), whereas an example of the DRM service corresponding to the PC 40 is Marlin.

Examples of a voice compressing method for music content shared in the content sharing system 10 include Atrac, AAC LC, HE-AAC, MP3, WMA, and LPCM. The number of information processing apparatuses owned by the same user is not limited to two, but may be three or more.

Next, a hardware configuration of the management server 20 according to this embodiment is described with reference to FIG. 2.

Figure 2:
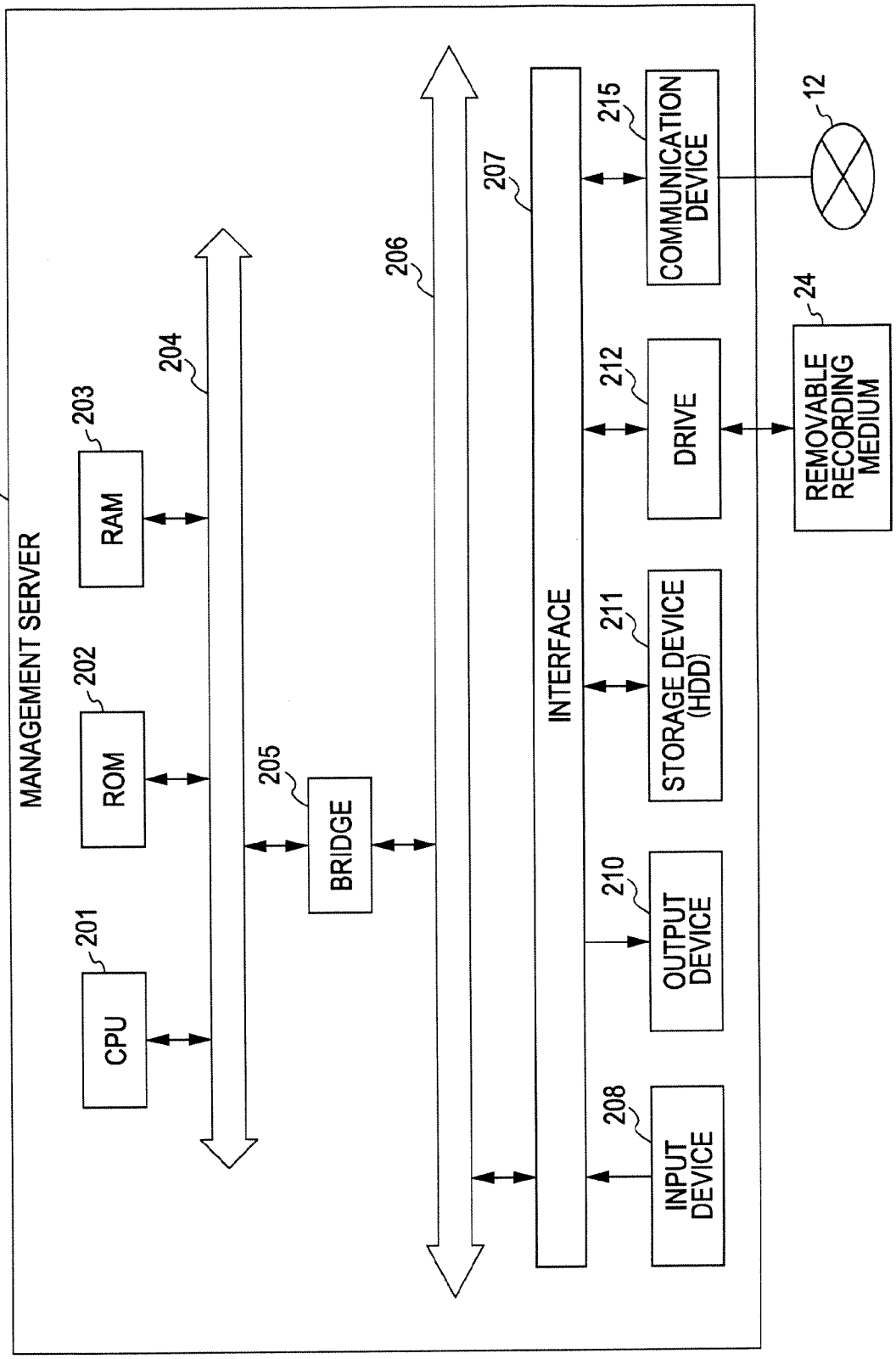
FIG. 2 is a block diagram of a hardware configuration of a management server according to the first embodiment.

FIG. 2 is a block diagram showing a hardware configuration of the management server 20. The management server 20 includes a CPU (central processing unit) 201, a ROM (read only memory) 202, a RAM (random access memory) 203, a host bus 204, a bridge 205, an external bus 206, an interface 207, an input device 208, an output device 210, a storage device (HDD) 211, a drive 212, and a communication device 215.

The CPU 201 functions as a processing device or a control device and controls an entire operation in the management server 20 in accordance with various programs. The ROM 202 stores programs and processing parameters used by the CPU 201. The RAM 203 temporarily stores programs used in execution of the CPU 201 and parameters that change during the execution. Those devices are mutually connected via the host bus 204 including a CPU bus or the like.

The host bus 204 connects to the external bus 206, such as a PCI (peripheral component interconnect/interface) bus, via the bridge 205.

The input device 208 includes an operation unit operated by a user, such as a mouse, keyboard, touch panel, button, switch, and lever, and an input control circuit to generate an input signal on the basis of an operation performed by the user and output the signal to the CPU 201. The user of the management server 20 can input various data to the management server 20 and provide instructions about a processing operation to the management server 20 by operating the input device 208.

The output device 210 includes a display device, such as a CRT (cathode ray tube) display device, an LCD (liquid crystal display) device, and a lamp, and a voice output device, such as a speaker and a headphone. The output device 210 outputs reproduced content, for example. More specifically, the display device displays various information of reproduced video data and the like in the form of text or image. On the other hand, the voice output device converts reproduced voice data to voice and outputs the voice.

The storage device 211 is a device for storing data, which is configured as an example of a storage unit of the management server 20 according to this embodiment, and includes an HDD (hard disk drive). The storage device 211 drives a hard disk and stores programs executed by the CPU 201 and various data. Also, the storage device 211 stores an apparatus ID, information of an apparatus to which a license is issued, and a residual number of times allocated (described below) while associating them with a user.

The drive 212 is a reader/writer for a recording medium and is included in or attached to the management server 20. The drive 212 reads information recorded on a removable recording medium 24 loaded thereto, such as a magnetic disk, an optical disc, a magneto-optical disc, or a semiconductor memory, and outputs the information to the RAM 203.

The communication device 215 is a communication interface including a communication device to access the communication network 12. The communication device 215 transmits/receives various data, such as content information, domain keys, licenses, and right information, between the content distributing server 16 and the mobile phone 30 and the PC 40 via the communication network 12.

The hardware configuration of the information processing apparatuses, such as the mobile phone 30 and the PC 40, is substantially the same as that of the management server 20, and thus the corresponding description is not repeated.

Next, a configuration of the management server 20 according to this embodiment is described with reference to FIG. 3.

Figure 3:
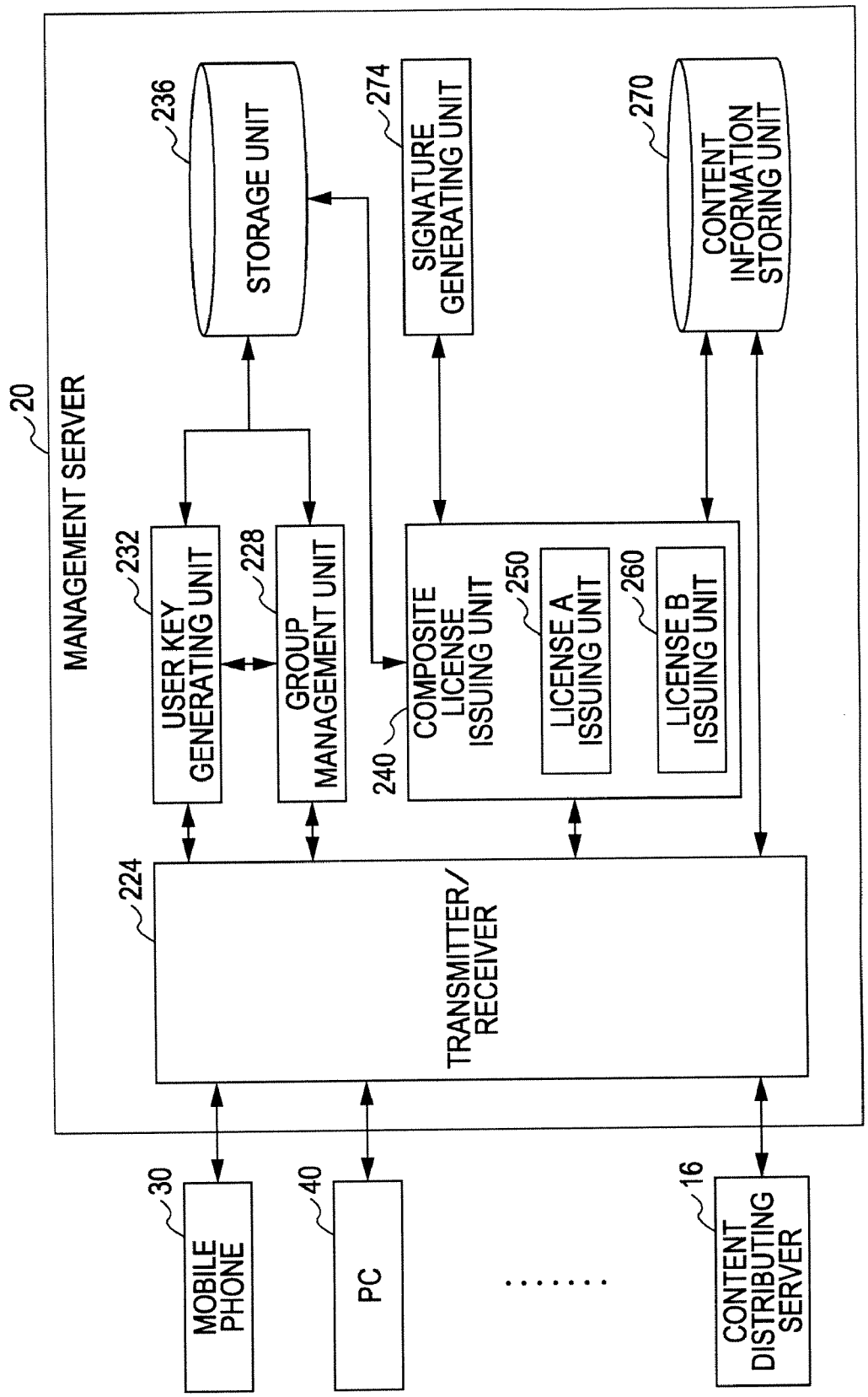
FIG. 3 is a block diagram of a configuration of the management server according to the first embodiment.

FIG. 3 is a block diagram showing the configuration of the management server 20 according to this embodiment. The management server 20 includes a transmitter/receiver 224, a group management unit 228, a user key generating unit 232, a storage unit 236, a composite license issuing unit 240, a content information storing unit 270, and a signature generating unit 274.

The transmitter/receiver 224 transmits/receives various data between the content distributing server 16 and the mobile phone 30 and the PC 40. For example, the transmitter/receiver 224 transmits/receives information about an encrypting method of content distributed from the content distributing server 16 to the information processing apparatuses to/from the content distributing server 16. On the other hand, the transmitter/receiver 224 transmits/receives a license (described below) to/from the mobile phone 30 and the PC 40.

The group management unit 228 instructs the user key generating unit 232 to generate a user key in accordance with a group generation request based on a user bind method from the information processing apparatuses (the mobile phone 30 and the PC 40), and generates a user account. Then, the group management unit 228 stores a user ID of the user, the user key generated by the user key generating unit 232, and apparatus IDs of the information processing apparatuses in the storage unit 236 while associating them with each other.

When receiving a request for registration in a group from an information processing apparatus, the group management unit 228 performs user authentication of the information processing apparatus and distributes a user key corresponding to the user to the information processing apparatus. The user bind method is a license issuing method for registering one or more information processing apparatuses owned by the same user in a group so that a license can be shared in the group. More specifically, this method is realized by encrypting a license so that the license can be decrypted with a user key held by each information processing apparatuses. Another example of the license issuing method is a device bind method for issuing a license that is limited to an information processing apparatus. In the user bind method, a license can be shared in a certain group. The group unit is not limited to a user, but a license can be shared in an arbitrary unit, e.g., in a family or a department of a company. In the following description of this embodiment, a user key is issued in units of users, but the user key may be issued in units of families or departments to which sharing of content is permitted.

The user key generating unit 232 generates a user key in accordance with instructions from the group management unit 228. The user key generated varies depending on a DRM service corresponding to each information processing apparatus even when the user key is issued to the information processing apparatuses owned by the same user. For example, the user key generating unit 232 according to this embodiment can generate user key A corresponding to the DRM-A service for the mobile phone and user key B corresponding to the DRM-B service for the PC. The user key generating unit 232 cooperates with the group management unit 228 so as to function as a registering unit. Hereinafter, the user key is described with reference to FIG. 4.

Figure 4:
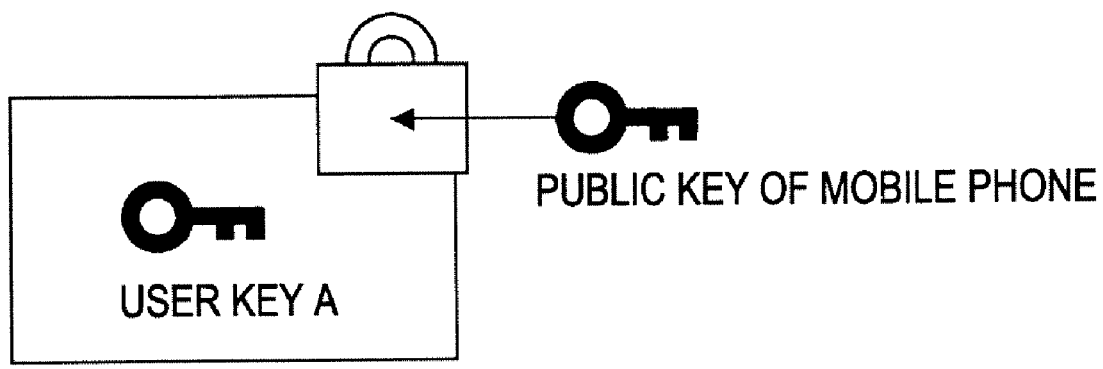
FIG. 4 is an illustration of user key A, which is an example of a user key generated by a user key generating unit according to the first embodiment.

FIG. 4 illustrates user key A, which is an example of a user key generated by the user key generating unit 232. User key A is used to encrypt/decrypt a content key included in license A (described below). As shown in FIG. 4, user key A can be encrypted by a unique public key of the mobile phone 30. Thus, the information processing apparatus that can decrypt encrypted user key A is limited to the mobile phone 30, and accordingly, user key A can be protected against tampering and tapping and can be safely distributed.

Likewise, user key B may be encrypted with a public key of the PC 40, as user key A. The types of user keys generated by the user key generating unit 232 may be varied in accordance with the number of DRM services dealt by the management server 20.

The storage unit 236 stores a user ID of the user whose account has been generated by the group management unit 228, an apparatus ID of the information processing apparatus, and a user key by associating them with each other. The apparatus ID of the information processing apparatus is identification information that is uniquely given to the information processing apparatus when the information processing apparatus is manufactured.

FIG. 5 is an illustration showing a table configuration of the data stored in the storage unit 236. In the example shown in FIG. 5, a user "Yamada" registers an information processing apparatus (mobile phone) "A001" corresponding to DRM-A and an information processing apparatus (PC) "B001" corresponding to DRM-B in a group. "User key A1" is distributed to the information processing apparatus corresponding to DRM-A owned by the user "Yamada", and "user key B1" is distributed to the information processing apparatus corresponding to DRM-B.

Also, a user "Shinagawa" registers information processing apparatuses "A002" and "A003" corresponding to DRM-A and information processing apparatuses "B002" and "B003" corresponding to DRM-B in a group.

"User key A2" is distributed to the information processing apparatuses corresponding to DRM-A owned by the user "Shinagawa", and "user key B2" is distributed to the information processing apparatuses corresponding to DRM-B. In this way, the same user key is issued to the information processing apparatuses that are owned by the same user and that correspond to the same DRM service. If the information processing apparatuses are owned by the same user but correspond to different DRM services, different user keys are issued thereto.

The composite license issuing unit 240 includes a license A issuing unit 250 and a license B issuing unit 260. The composite license issuing unit 240 according to this embodiment issues a composite license including license A for the mobile phone 30 issued by the license A issuing unit 250 and license B for the PC 40 issued by the license B issuing unit 260. The license is issued for each DRM service.

Alternatively, the license A issuing unit 250 and the license B issuing unit 260 may be provided in separate servers. In that case, the composite license issuing unit 240 issues a composite license by combining license A and license B issued by the separate servers. The issued composite license may be stored in the storage unit 236. Now, a configuration of each license included in the composite license is described with reference to FIGS. 6 and 7.

Figure 6:
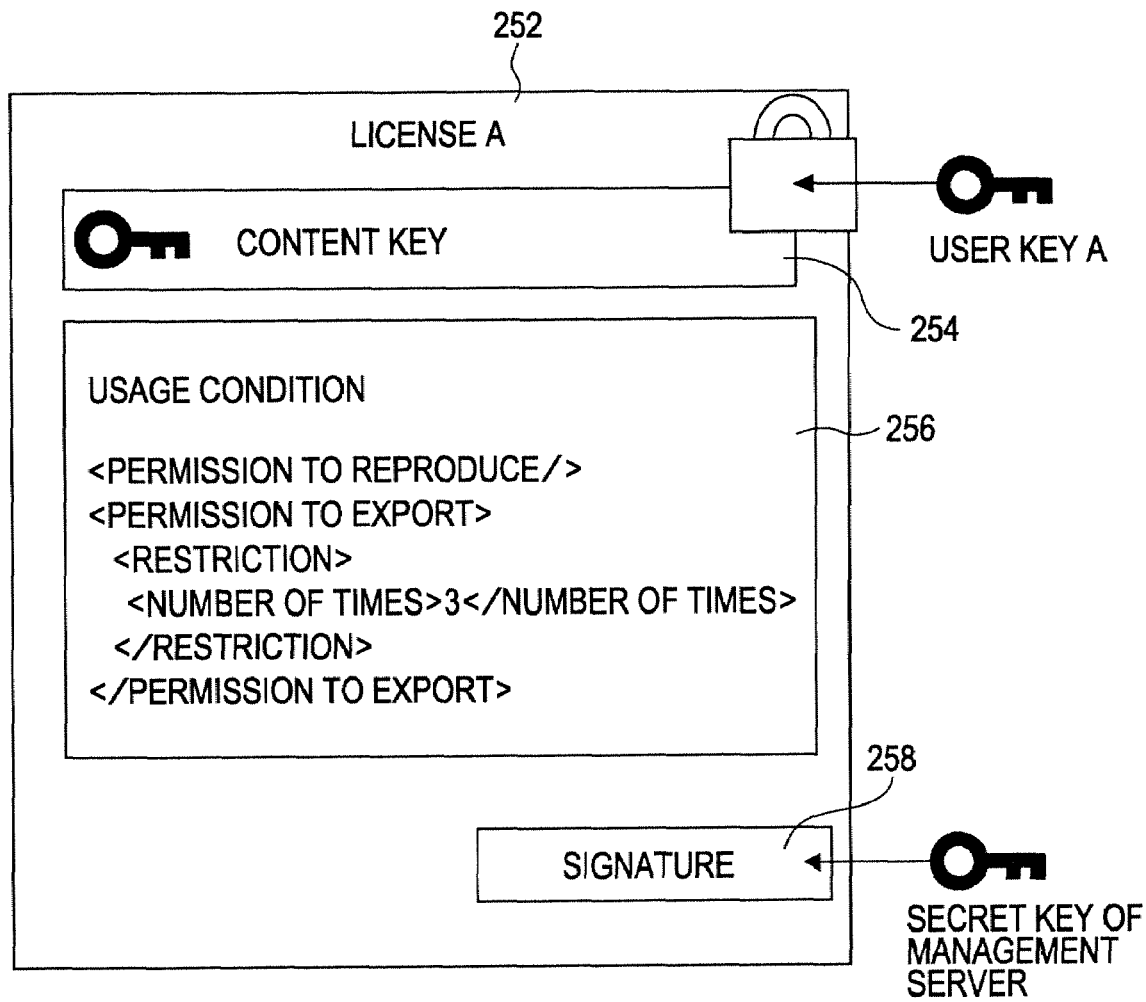
FIG. 6 is an illustration of a configuration of license A issued by a license A issuing unit according to the first embodiment.
Figure 7:
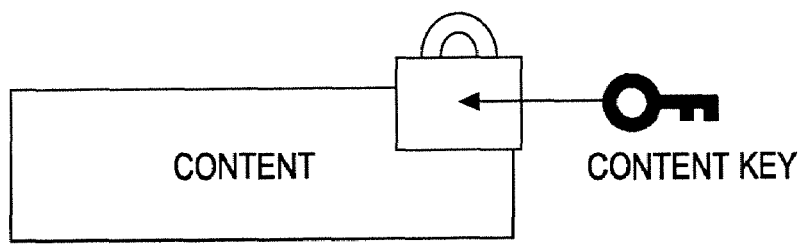
FIG. 7 is an illustration of a configuration of encrypted content distributed by a content distributing server according to the first embodiment.

FIG. 6 is an illustration of a configuration of a license A 252 issued by the license A issuing unit 250. FIG. 7 is an illustration of a configuration of encrypted content distributed by the content distributing server 16. The license A 252 includes a content key 254, a usage condition 256, and a signature 258.

The content distributed by the content distributing server 16 is encrypted with the content key, as show in FIG. 7. The content key 254 included in the license A 252 is used to decrypt the encrypted content. When issue of a license for content is requested, the content key 254 that encrypts the content can be extracted from the content information storing unit 270 and can be included in the license. The use of the content key 254 in the information processing apparatus is permitted if the usage condition 256 and the signature 258 (described below) satisfy a predetermined requirement.

The content key 254 is encrypted with user key A and is included in the license A 252 as first encrypted data. With this configuration, only the information processing apparatus having user key A can use the content on the basis of the content key 254 included in the license A 252.

Likewise, license B issued by the license B issuing unit 260 includes a content key encrypted with user key B as second encrypted data.

The usage condition 256 describes restrictions on the use of the content key 254 by the information processing apparatus. The usage condition 256 shown in FIG. 6 does not describe restrictions on reproducing. In this way, if no restriction is described, the content key 254 can be used for that usage pattern without restriction as long as the other conditions are satisfied.

On the other hand, restrictions are put on the number of times of export. Thus, the number of times of export is limited to three, as shown in FIG. 6. The number of times may be a state value that is decremented every time the mobile phone 30 executes export. In that case, the mobile phone 30 is prohibited to execute export when the state value is 0 (zero).

The signature 258 is encrypted with a secret key of the management server 20 by the signature generating unit 274 so that the entire license A 252 is encrypted. Thus, if the signature can be decrypted with a public key of the management server 20, it is determined that the license A 252 is duly issued by the management server 20. At the same time, the validity of the license A 252 can be verified.

The entire license A 252 or the usage condition 256 may be encrypted with the user key. With this configuration, license A can be issued to an information processing apparatus while ensuring the confidentiality of license A. The user key to encrypt the license and the user key to decrypt the license are not necessarily identical, but the both may be asymmetrical.

When the composite license issuing unit 240 changes the usage condition written in license A included in the issued composite license, the composite license issuing unit 240 can also change the usage condition written in license B. For example, when the management server 20 increases the number of times of export permitted in license A by three on the basis of a request from a user, the number of times of export permitted in license B may also be increased by three.

Specifically, the management server 20 transmits change data of the composite license to the mobile phone 30, and the composite license is modified on the basis of the change data on the mobile phone 30 side. With this configuration, the user can change the data of all licenses included in the composite license only by requesting change of the data of one license to the management server 20.

The content information storing unit 270 stores an ID of the encrypted content distributed from the content distributing server 16 to the information processing apparatus and the content key to decrypt the content while associating them with each other. Accordingly, the composite license issuing unit 240 can obtain a desired content key and generate a license by searching the content information storing unit 270.

The content information storing unit 270 may store data of content and date and time of distribution of the content as well as the content key.

The signature generating unit 274 cooperates with the composite license issuing unit 240 so as to give a signature to a license. With this configuration, tampering of the license can be prevented and the validity of a transmitter can be secured.

Next, a configuration of the mobile phone 30 according to this embodiment is described with reference to FIG. 8.

Figure 8:
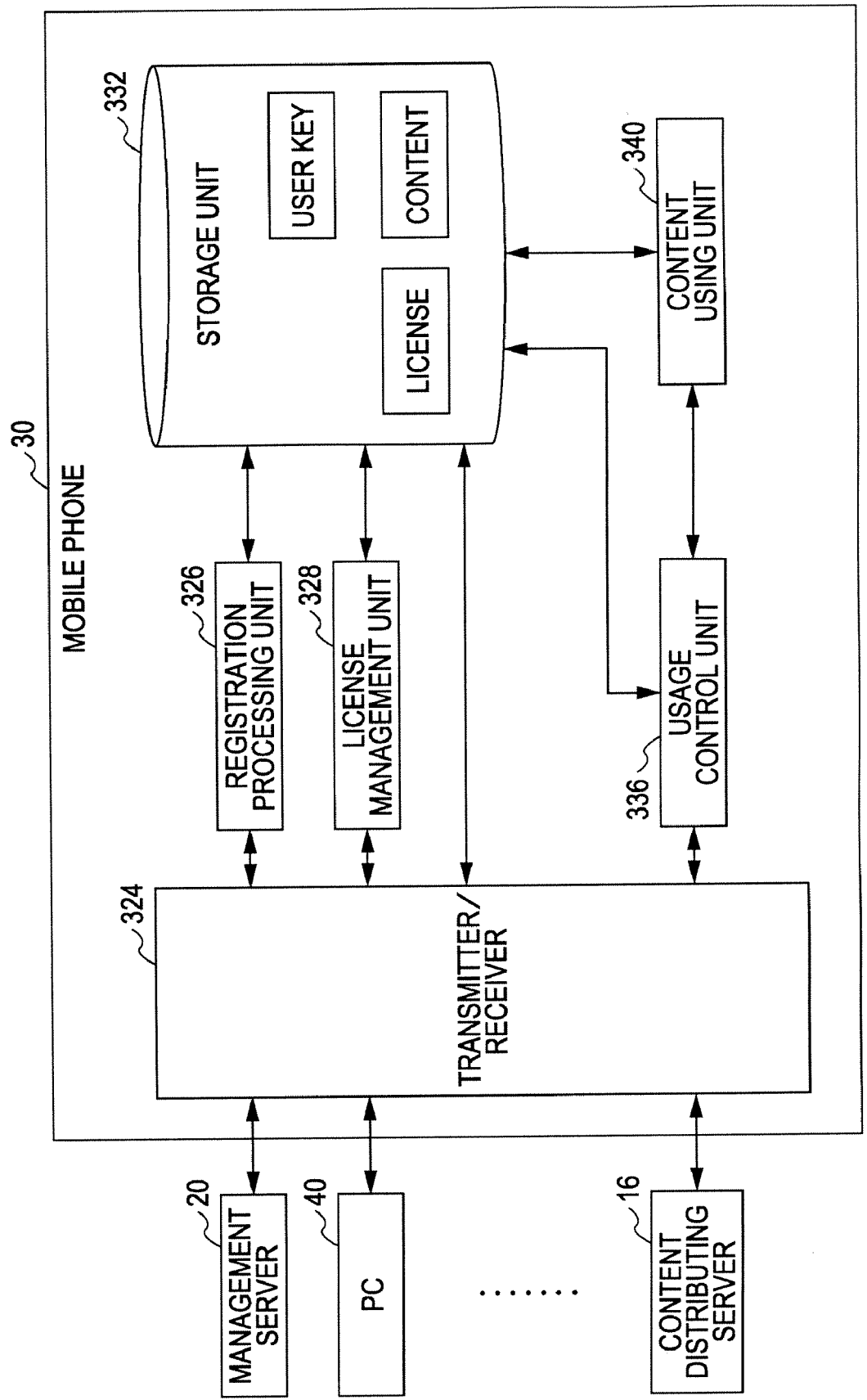
FIG. 8 is a block diagram of a configuration of a mobile phone according to the first embodiment.

FIG. 8 is a block diagram showing the configuration of the mobile phone 30 according to this embodiment. The mobile phone 30 includes a transmitter/receiver 324, a registration processing unit 326, a license management unit 328, a storage unit 332, a usage control unit 336, and a content using unit 340.

The transmitter/receiver 324 transmits/receives various data between the content distributing server 16 and the management server 20. For example, the transmitter/receiver 324 transmits/receives encrypted content to/from the content distributing server 16 and transmits/receives a license to/from the management server 20. Also, the transmitter/receiver 324 transmits/receives a content file (described below) to/from the PC 40.

The registration processing unit 326 performs processes to the management server 20, e.g., a request for generating an account, a request for registering an apparatus, and a request for cancelling registration of an apparatus. The request for generating an account means requesting generation of a group of information processing apparatuses owned by a user to the management server 20. In response to the request, the management server 20 stores the user ID of the user and the apparatus IDs of the information processing apparatuses owned by the user while associating them with each other. A user key is issued to each of the information processing apparatuses registered in a group in the generated account.

The request for registering an apparatus means requesting additional registration of an information processing apparatus in an existing group to the management server 20. In response to the request, the management server 20 specifies the group in which the information processing apparatus is to be registered and issues a user key corresponding to the group to the information processing apparatus.

The request for cancelling registration of an apparatus means requesting cancellation of registration of an information processing apparatus registered in a group to the management server 20. The management server 20 receives the request together with the apparatus ID of the information processing apparatus to be cancelled, and deletes registration of the information processing apparatus from the corresponding group.

The license management unit 328 requests issue of a license allowing use of encrypted content to the management server 20. When the license is issued by the management server 20, the license is stored in the storage unit 332.

The storage unit 332 stores user keys, licenses, and encrypted content. The licenses and encrypted content may be stored as a content file (described below) in the storage unit 332.

Figure 9:
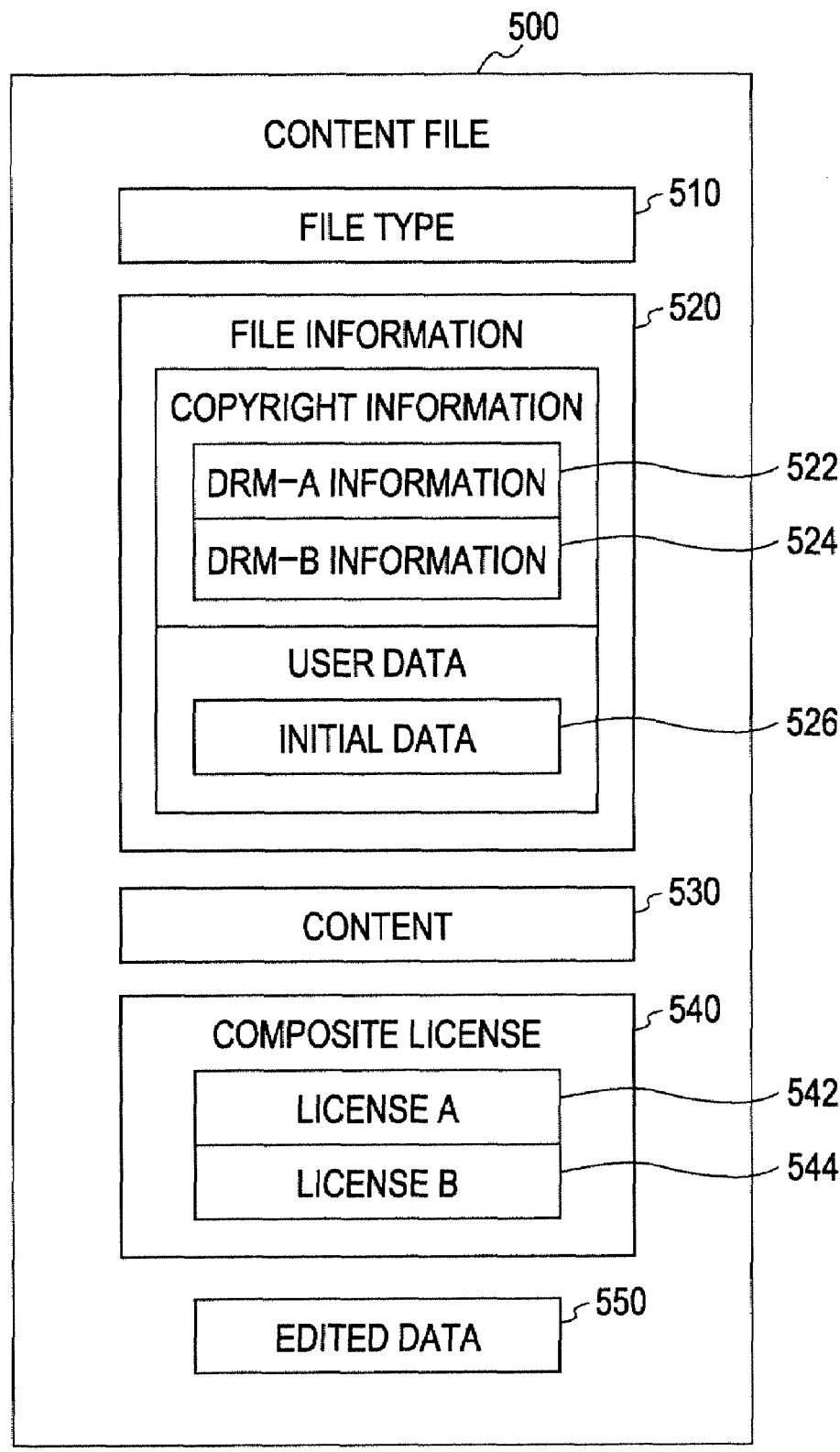
FIG. 9 is an illustration of a data configuration of a content file stored in the storage unit according to the first embodiment.

FIG. 9 is an illustration of a data configuration of a content file 500 stored in the storage unit 332. The content file 500 includes a file type 510, file information 520, content 530, a composite license 540, and edited data 550.

The file type 510 is simple file identification information indicating that the file is a content file. The file information 520 includes DRM-A information 522 and DRM-B information 524 as copyright information and initial data 526. The DRM-A information 522 and the DRM-B information 524 include a content ID to identify the content 530 and information of a source issuing the composite license 540. The initial data 526 is metadata indicating a voice compression method of the content 530, a sampling condition, and a partition of data.

The content 530 is encrypted content distributed from the content distributing server 16. Specifically, the content 530 is encrypted with a content key, as shown in FIG. 7.

The composite license 540 according to this embodiment includes license A and license B. As described above with reference to FIG. 6, license A includes the content key encrypted with user key A, and license B includes the content key encrypted with user key B. License A and license B may include the same content key. Details of an operation and an effect based on this configuration will be described below.

The edited data 550 is made by editing the initial data 526 after the user has copied the data. Herein, edit of the initial data 526 by the user is prohibited. However, the configuration not allowing edit of the initial data 526, that is, various metadata, is inconvenient to the user.

In this embodiment, a user can generate a copy of the initial data 526 and edit the copy as the edited data 550 in accordance with his/her preference or purpose. Since the content file 500 includes the initial data 526, the edited data 550 can be returned to an initial state even after being edited.

Referring back to FIG. 8, the usage control unit 336 receives a request for using content from a user and determines whether the user can use the content. When use of the content is permitted by the usage control unit 336, the content using unit 340 uses the content in accordance with the specified usage pattern. Hereinafter, operations of the usage control unit 336 and the content using unit 340 are described with reference to FIG. 10.

Figure 10:
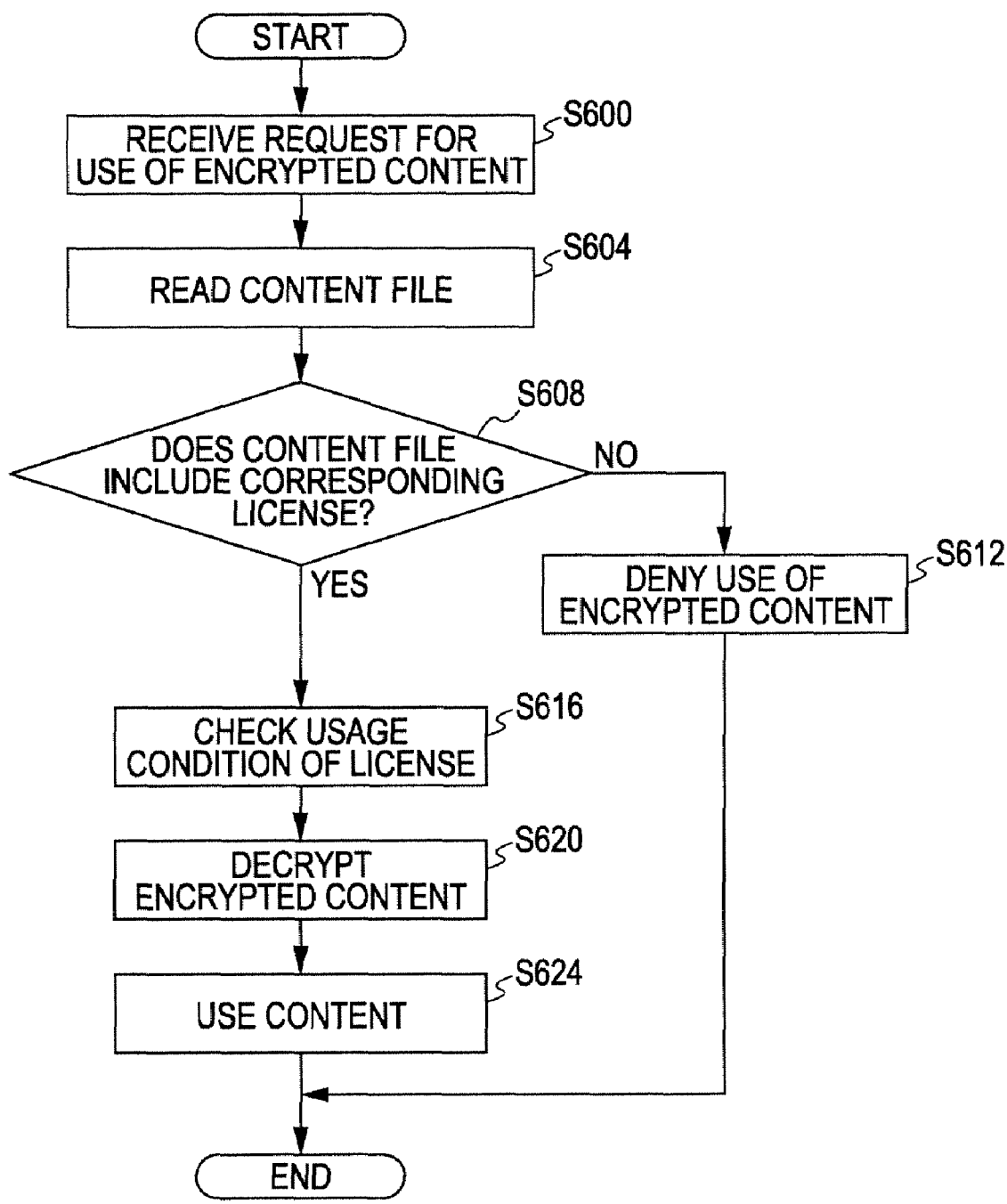
FIG. 10 is a flowchart showing a process performed by a usage control unit and a content using unit according to the first embodiment.

FIG. 10 is a flowchart showing a process performed by the usage control unit 336 and the content using unit 340. The usage control unit 336 receives a request for use of encrypted content from a user (step S600). Then, the usage control unit 336 reads the content file including the requested encrypted content from the storage unit 332 (step S604).

Then, the usage control unit 336 determines whether the content file read from the storage unit 332 includes a license corresponding to the own apparatus (step S608). If determining that the content file does not include the corresponding license, the usage control unit 336 denies the request for use of the encrypted content (step S612).

For example, since the mobile phone 30 corresponds to license A, the usage control unit 336 determines whether the content file includes license A (step S608). If determining that the content file does not include license A, the usage control unit 336 denies the request for use of the encrypted content (step S612).

If determining in step S608 that the content file read from the storage unit 332 includes the license corresponding to the own apparatus, the usage control unit 336 checks the usage condition of the license (step S616). If the usage condition of the license is satisfied, the usage control unit 336 obtains the content key included in the license by using a user key and decrypts the encrypted content on the basis of the content key (step S620). Finally, the content using unit 340 uses the decrypted content in accordance with the usage pattern specified by the user (step S624).

For example, if determining that the content file includes license A, the usage control unit 336 checks the usage condition (step S616). If the specified usage pattern is export, the usage control unit 336 checks the number of times of use that is described in the usage condition about export. If the usage condition of the license is satisfied, the usage control unit 336 obtains the content key included in the license by using the user key and decrypts the encrypted content on the basis of the content key (step S620). Finally, the content using unit 340 executes export of the decrypted content (step S624).

The configuration of the mobile phone 30 has been described above with reference to FIG. 8. The configuration of the PC 40 has many parts common to those of the mobile phone 30. A significant difference is that the PC 40 includes a ripping unit. The ripping unit has a function of reading content stored in a medium such as a CD or a DVD and storing the content in the storage unit 332. Typically, the content is not encrypted, and thus the content can be used in the mobile phone 30 if the content is transferred to the mobile phone 30.

Next, a process performed by the content sharing system 10 according to this embodiment is described with reference to FIG. 11.

Figure 11:
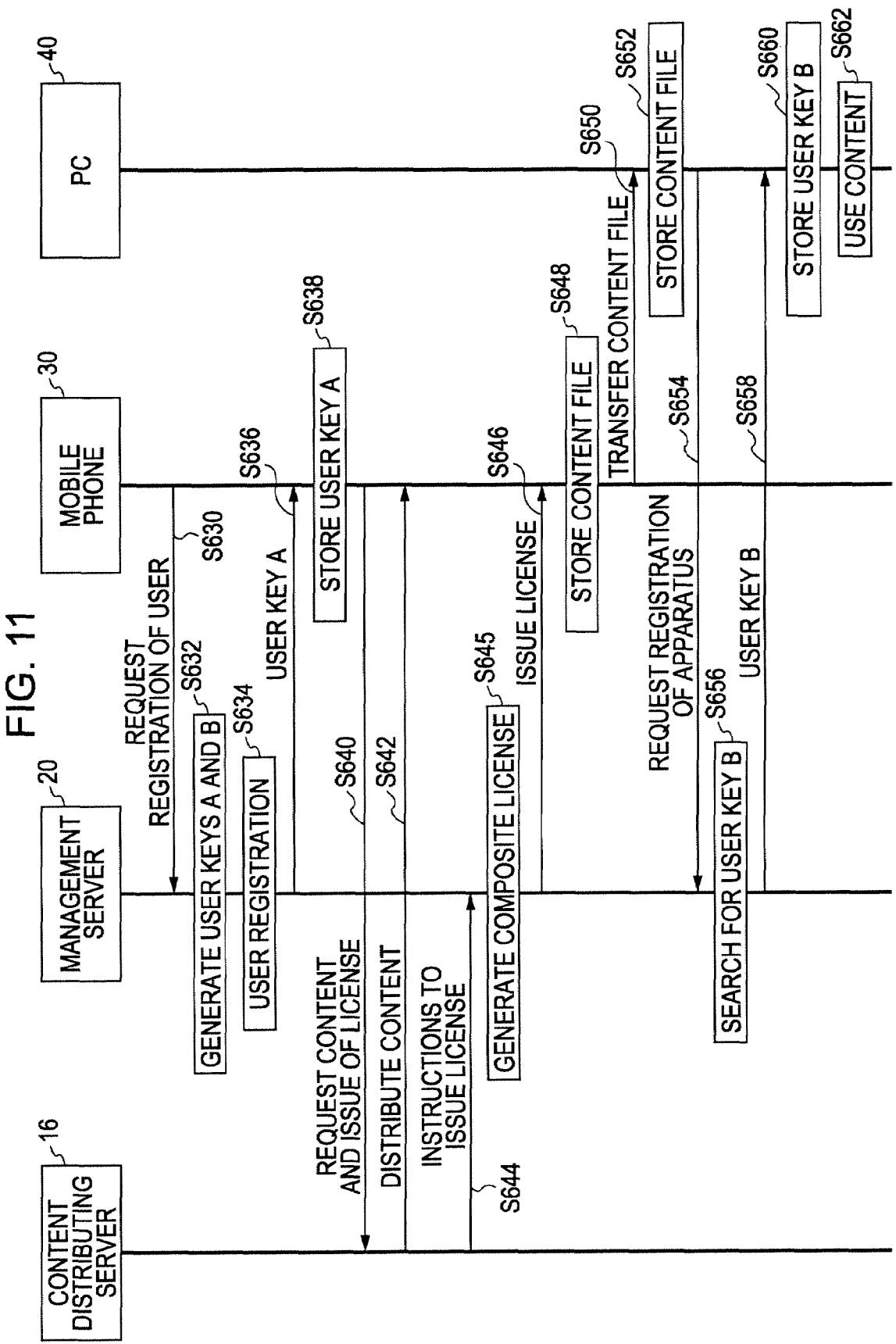
FIG. 11 is a sequence diagram of a process performed by the content sharing system according to the first embodiment.
Figure 12:
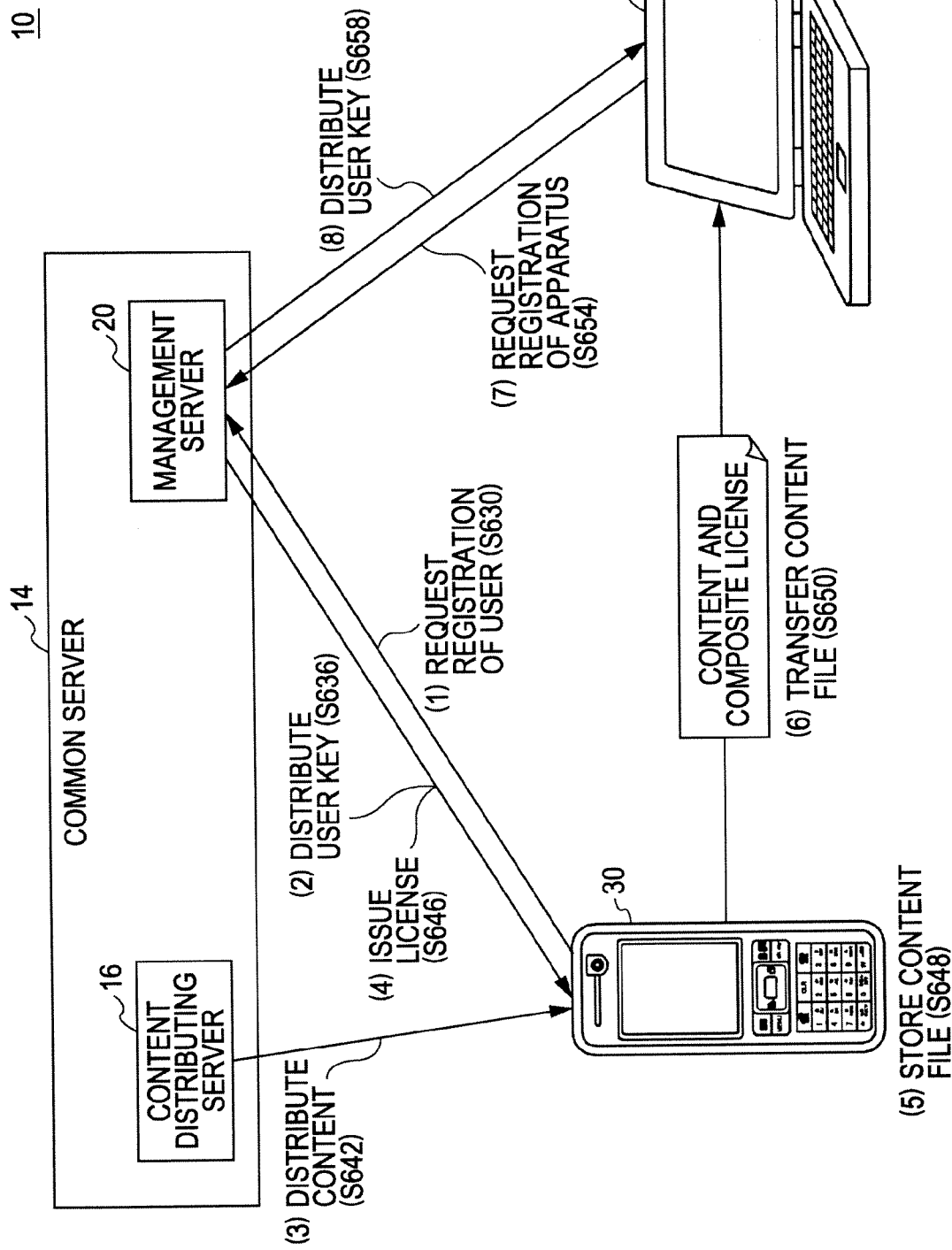
FIG. 12 is an illustration of the process performed by the content sharing system according to the first embodiment.

FIG. 11 is a sequence diagram showing the process performed by the content sharing system 10 according to this embodiment. FIG. 12 is an illustration of the process performed by the content sharing system 10 according to this embodiment.

First, the mobile phone 30 requests registration of a user (requests generation of account) to the management server 20 (step S630). In response to the request, the management server 20 generates user key A for the mobile phone 30 and user key B for the PC 40 (step S632). The management server 20 receives the apparatus ID of the mobile phone 30 together with the request from the mobile phone 30, and stores the apparatus ID, the user ID of the user owning the mobile phone 30, and user keys A and B while associating them with each other (step S634). Then, the management server 20 distributes the generated user key A to the mobile phone 30 (step S636). The mobile phone 30 receives user key A from the management server 20 and stores user key A (step S638). Alternatively, the management server 20 may store the apparatus ID of the mobile phone 30, the user ID of the user owning the mobile phone 30, and user keys A and B while associating them with each other (step S634) after issuing user key A (step S636).

Then, the mobile phone 30 requests distribution of content to the content distributing server 16 (step S640). In response to the request, the content distributing server 16 distributes encrypted content to the mobile phone 30 (step S642). Also, the content distributing server 16 instructs the management server 20 to issue the license (step S644). That is, the request for distributing content from the mobile phone 30 to the content distributing server 16 includes a request for issuing a license to the management server 20. The request for issuing a license may be directly transmitted from the mobile phone 30 to the management server 20. Then, in response to the instructions from the content distributing server 16, the management server 20 generates a composite license including license A, which includes a content key encrypted with user key A, and license B, which includes a content key encrypted with user key B (step S645). User key B is generated at the same time as user key A in step S632 in the above description. However, user key B may be generated in response to the instructions to issue the license from the content distributing server 16.

Then, the management server 20 issues the generated composite license to the mobile phone 30 (step S646). The mobile phone 30 receives the composite license from the management server 20 and generates a content file by storing the composite license in the encrypted content or associating the composite license with the encrypted content (step S648). Accordingly, the mobile phone 30 can use the encrypted content on the basis of license A included in the composite license.

Then, the mobile phone 30 transfers the content file to the PC 40 (step S650). Since the content file is simply transferred, there is no restriction about a transfer method, and any of an SD card, a memory stick, a USB, and a WiFi (wireless Fidelity) may be used.

The PC 40 receives the content file from the mobile phone 30 and stores the content file (step S652). If the PC 40 is registered, it can be determined that the corresponding license B is included in the content file, and thus the PC 40 requests registration of the apparatus to the management server 20 (step S654). If the PC 40 has already been registered, the request is unnecessary.

In response to the request from the PC 40, the management server 20 performs user authentication and adds the PC 40 to the group including the mobile phone 30 owned by the same user. Then, the management server 20 searches for user key B that is generated in step S632 (step S656) and distributes user key B to the PC 40 (step S658). The management server 20 can perform user authentication by requesting the user ID and a password. The PC 40 receives user key B and stores it (step S660). Then, the PC 40 decrypts license B included in the composite license by using user key B, so that the encrypted content can be used on the basis of the decrypted license B (step S662).

In the above description, the content file is transferred from the mobile phone 30 to the PC 40 so that the content can be shared between the mobile phone 30 and the PC 40. Alternatively, the content file can be transferred from the PC 40 to the mobile phone 30 in the same manner so that the content can be shared between the PC 40 and the mobile phone 30.

At this time, the group management unit 228 may separately issue a first user key A to use license A that is directly issued by the management server 20 to the mobile phone 30 and a second user key A to use license A that is transferred from the PC 40 to the mobile phone 30. With this configuration, the number of mobile phones 30 that can use the content on the basis of license A that is directly issued by the management server 20 and the number of mobile phones 30 that can use the content on the basis of license A that is transferred from the PC 40 can be separately set.

Likewise, the group management unit 228 may separately issue a first user key B to use license B that is directly issued by the management server 20 to the PC 40 and a second user key B to use license B that is transferred from the mobile phone 30 to the PC 40. With this configuration, the number of PCs 40 that can use the content on the basis of license B that is directly issued by the management server 20 and the number of PCs 40 that can use the content on the basis of license B that is transferred from the mobile phone 30 can be separately set.

FIG. 13 is an illustration of an example of the maximum numbers of apparatuses to which respective user keys are issued. The user keys are issued to the information processing apparatuses registered in a group, and thus the maximum number of apparatuses to which the user key is issued is substantially the same as the maximum number of the information processing apparatuses that can be registered in the group.

In the example shown in FIG. 13, the management server 20 limits the maximum number of apparatuses to which the first user key A is issued to 1, the maximum number of apparatuses to which the second user key A is issued to 1, the maximum number of apparatuses to which the first user key B is issued to 2, and the maximum number of apparatuses to which the second user key B is issued to 1, for the user "Yamada".

On the other hand, for the user "Shinagawa", the management server 20 limits the maximum number of apparatuses to which the first user key A is issued to 1, the maximum number of apparatuses to which the second user key A is issued to 0, the maximum number of apparatuses to which the first user key B is issued to 1, and the maximum number of apparatuses to which the second user key B is issued to 2. In this case, since the maximum number of apparatuses to which the second user key A is issued is 0, license A transferred from the PC 40 cannot be used in the mobile phone 30 owned by the user "Shinagawa".

In this way, the management server 20 according to this embodiment is capable of setting the information processing apparatuses that can use a license and the number thereof for each path of obtaining the license, even among the information processing apparatuses that are owned by the same user and that correspond to the same DRM-service.

As described above, a significant characteristic of the content sharing system 10 according to this embodiment is that, if the management server 20 receives a request for issuing a license from an information processing apparatus, the management server 20 issues a composite license including a plurality of licenses to the information processing apparatus.

With this configuration, if the information processing apparatus transfers content and the composite license to another information processing apparatus corresponding to any of the licenses included in the composite license, the other information processing apparatus on the transferred side can use the content.

The management server 20 generates user key B in advance in step S632 in FIG. 11 if the PC 40 has not been registered in the group and issues the composite license on the basis of the user key. With this configuration, even if the PC 40 is registered in the group after the composite license has been issued, the PC 40 can use content on the basis of the composite license that is issued in advance.

In the above description, the management server 20 includes a single server. Alternatively, the management server 20 may include servers for respective DRM services. Hereinafter, this configuration is described with reference to FIG. 14.

Figure 14:
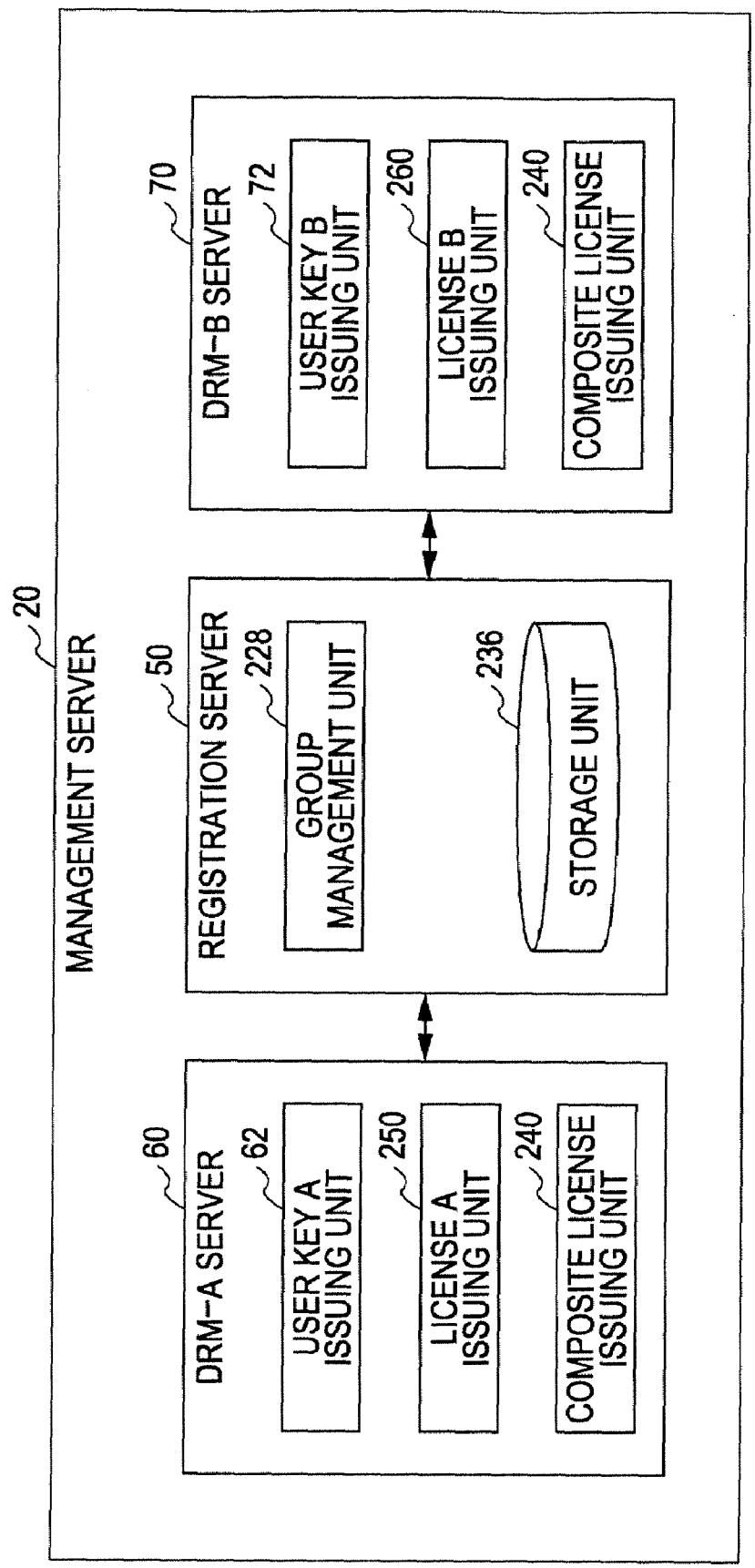
FIG. 14 is an illustration of another example of the configuration of the management server.

FIG. 14 is an illustration of another example of the configuration of the management server 20. The management server 20 includes a registration server 50 including the group management unit 228 and the storage unit 236; a DRM-A server 60 including a user key A issuing unit 62, the license A issuing unit 250, and the composite license issuing unit 240; and a DRM-B server 70 including a user key B issuing unit 72, the license B issuing unit 260, and the composite license issuing unit 240. Hereinafter, the difference from the configuration shown in FIG. 3 is shortly described.

The user key A issuing unit 62 issues user key A to an information processing apparatus registered with the DRM-A service. The user key B issuing unit 72 issues user key B to an information processing apparatus registered with the DRM-B service. The composite license issuing unit 240 can issue a composite license on the basis of license A and license B issued in the DRM-A server 60 and the DRM-B server 70. In this way, the management server 20 may be configured by cooperation of a plurality of servers, such as the registration server 50, the DRM-A server 60, and the DRM-B server 70.

Second Embodiment

Hereinafter, a content sharing system according to a second embodiment is described. The management server 20 according to the first embodiment is characteristic in that, when the management server 20 issues a license corresponding to a DRM service to an information processing apparatus, the management server 20 also issues a license corresponding to another DRM service. However, in the management server 20 according to the first embodiment, if an existing server issues a license that can be used in an information processing apparatus to the information processing apparatus, it is difficult to realize sharing of content between the information processing apparatus and another information processing apparatus.

According to the second embodiment of the present invention, there is provided a management server capable of issuing a group license so that, even if an information processing apparatus does not have a license corresponding to another information processing apparatus to which content is transferred, the content can be used in the information processing apparatus on the transferred side. Hereinafter, the content sharing system according to the second embodiment is described mainly about the difference from the first embodiment.

Figure 15:
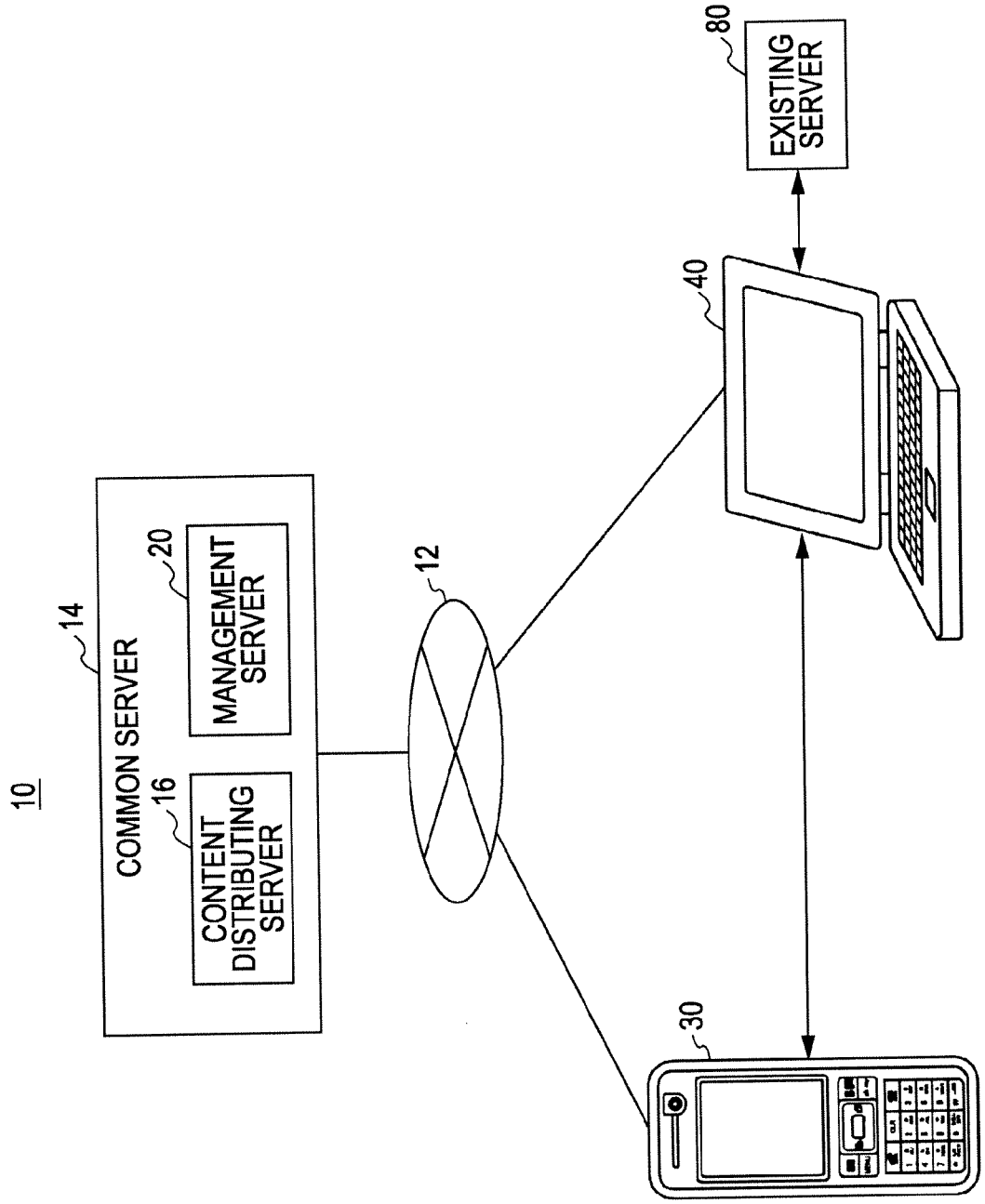
FIG. 15 is an illustration of a content sharing system according to a second embodiment of the present invention.

FIG. 15 is an illustration of the content sharing system 10 according to the second embodiment. The content sharing system 10 includes a communication network 12, a common server 14, a mobile phone 30, a PC 40, and an existing server 80.

The existing server 80 issues content and license corresponding to an arbitrary DRM service to the PC 40. In this specification, the DRM service provided by the existing server 80 is referred to as DRM-C and a license based on DRM-C is referred to as license C. An example of DRM-C is OpenMG.

The PC 40 corresponds to DRM-C and is capable of using content on the basis of license C. The management server 20 and the PC 40 according to this embodiment are configured so that the content provided to the PC 40 from the existing server 80 can also be used in the mobile phone 30. Hereinafter, the configuration of the management server 20 and the PC 40 according to this embodiment is described.

Figure 16:
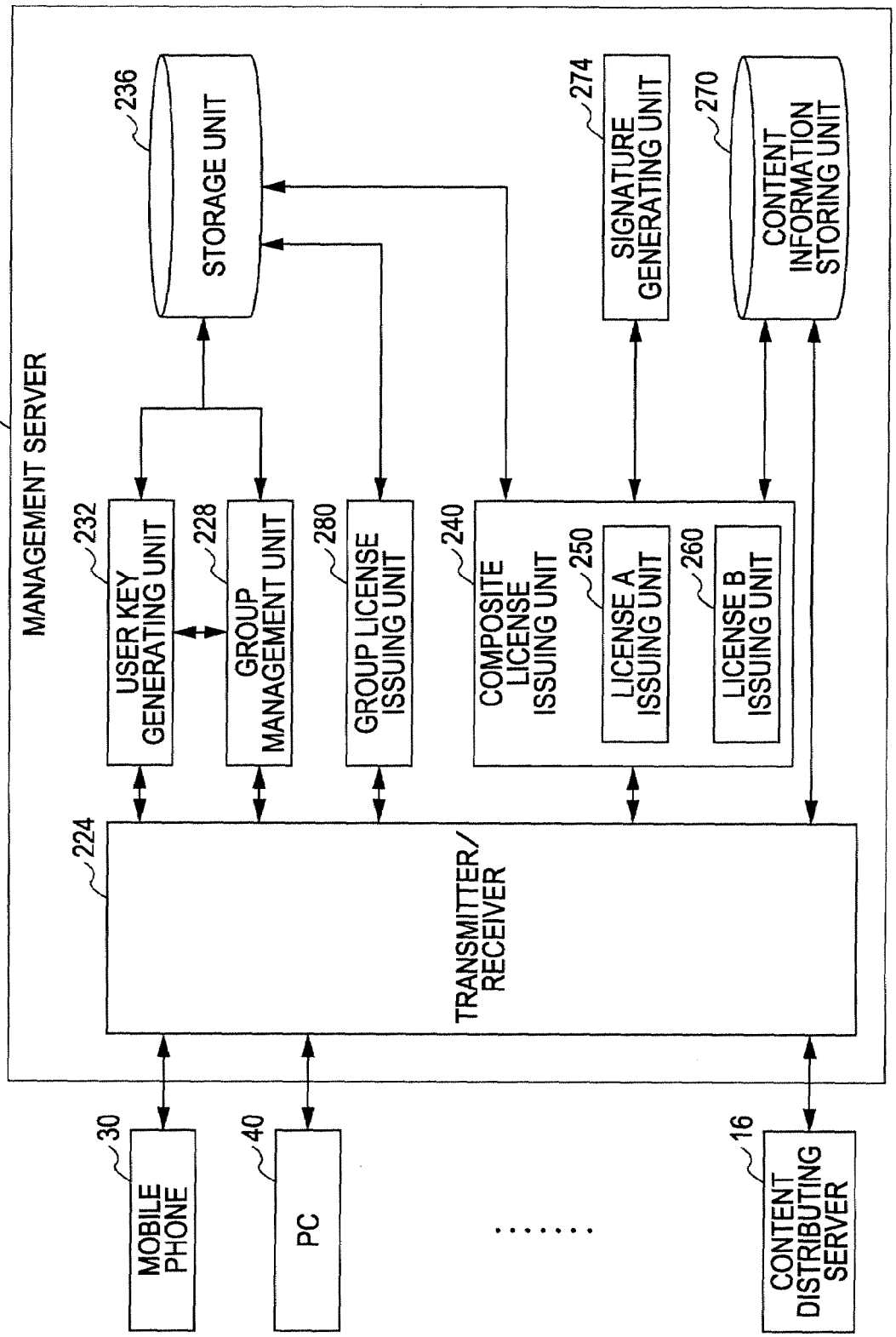
FIG. 16 is a block diagram of a configuration of a management server according to the second embodiment.

FIG. 16 is a block diagram showing the configuration of the management server 20 according to this embodiment. The management server 20 includes a transmitter/receiver 224, a group management unit 228, a user key generating unit 232, a storage unit 236, a composite license issuing unit 240, a content information storing unit 270, a signature generating unit 274, and a group license issuing unit 280.

The function and configuration of the transmitter/receiver 224, the group management unit 228, the user key generating unit 232, the composite license issuing unit 240, the content information storing unit 270, and the signature generating unit 274 are substantially the same as those described in the first embodiment, and thus the corresponding description is not repeated.

The group license issuing unit 280 issues a group key and a group license in response to a request from the PC 40. The storage unit 236 stores the group license and the group key issued by the group license issuing unit 280 and the apparatus ID of the information processing apparatus to which the group license and the group key are issued while associating them with each other.

Figure 17:
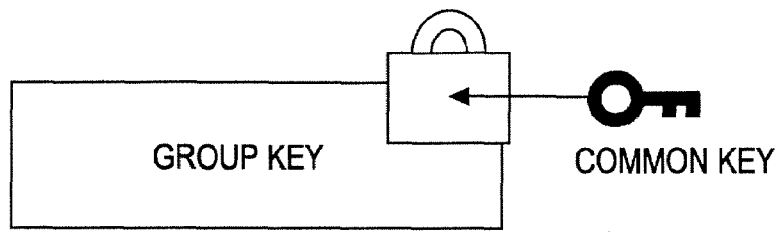
FIG. 17 is an illustration of a configuration of a group key according to the second embodiment.

FIG. 17 is an illustration of a configuration of the group key. The group key is used to encrypt and decrypt a content item key (described below), and is encrypted with a common key that is common to the management server 20 and the PC 40 to which the group key is issued.

The common key is a common secret key held by the management server 20 and the PC 40 in advance. The common key may be transmitted from the management server 20 to the PC 40 at the time of registration of the PC 40 or before issue of the group key. Hereinafter, a configuration of the group license is described with reference to FIG. 18.

Figure 18:
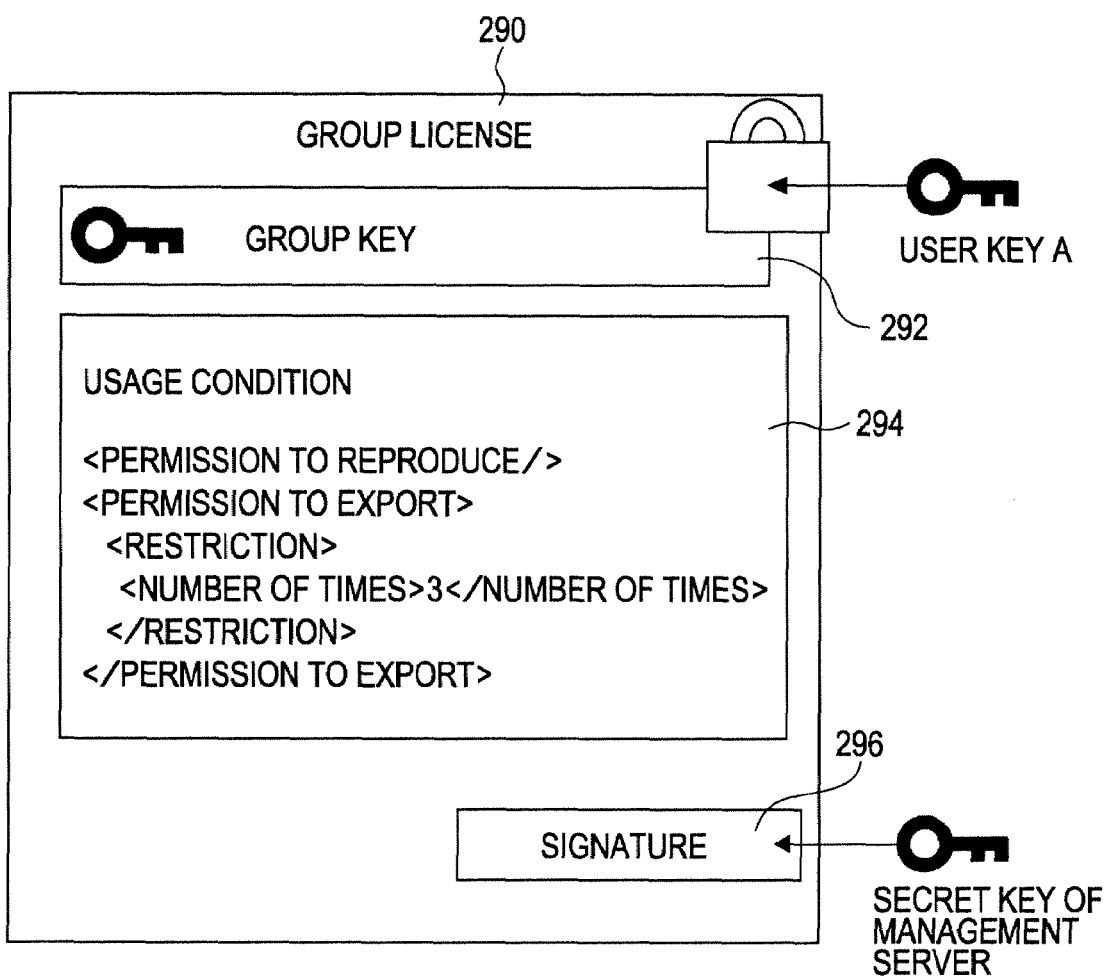
FIG. 18 is an illustration of a configuration of a group license according to the second embodiment.

FIG. 18 is an illustration of a configuration of the group license 290. The group license 290 includes a group key 292, a usage condition 294, and a signature 296.

The group key 292 is encrypted so that it can be decrypted in the information processing apparatus to which the content and the group license 290 are transferred. In this embodiment, assume that the content and the group license 290 are transferred from the PC 40 to the mobile phone 30. Thus, the group key 292 is encrypted with user key A in FIG. 18. The user key issued to the PC 40 is user key B corresponding to DRM-B, and thus the group key 292 encrypted with user key A cannot be decrypted in the PC 40.

The usage condition 294 describes restrictions on the use of the group key 292 and the encrypted content in the mobile phone 30. The usage condition 294 shown in FIG. 18 does not describe restrictions on reproducing. In this way, if no restriction is described, the group key 292 can be used for that usage pattern without restriction as long as the other conditions are satisfied.

On the other hand, the number of times is restricted on export. Thus, as shown in FIG. 18, the number of times of export is restricted to three. The number of times may be a state value that is decremented every time the mobile phone 30 executes export. In that case, the mobile phone 30 is prohibited to execute export when the state value is 0 (zero).

The signature 296 is encrypted with a secret key of the management server 20 by the signature generating unit 274 so that the entire license is encrypted. If the signature can be decrypted with a public key of the management server 20, it is determined that the group license 290 is duly issued by the management server 20. At the same time, the validity of the group license 290 can be verified.

The entire group license 290 or the usage condition 294 may be encrypted with user key A. With this configuration, the group license 290 can be issued to an information processing apparatus while ensuring the confidentiality of the group license 290. User key A to encrypt the license and user key A to decrypt the license are not necessarily identical, but the both may be asymmetrical.

The above-described group license and group key may be issued to an information processing apparatus.

Alternatively, the group license and the group key may be issued for each DRM service corresponding to content owned by the information processing apparatus. This configuration is described below with reference to FIG. 19.

FIG. 19 is an illustration showing a state where the group license issuing unit 280 issues group licenses to the PC 40, the state being stored in the storage unit 236. In FIG. 19, the group license and the group key are issued for each DRM service corresponding to the content owned by the PC 40.

Specifically, the group license issuing unit 280 separately issues group license C and group key C used to transfer the content of DRM-C owned by the PC 40 and group license D and group key D used to transfer the content of DRM-D. Group license C and group key C and group license D and group key D may be IDs of the group licenses and the group keys.

In this way, the group license issuing unit 280 issues a group license and a group key for each DRM service corresponding to the content owned by the information processing apparatus, so that encrypted content can be protected more securely.

More specifically, even if a group key corresponding to a DRM service issued by the group license issuing unit 280 is decrypted by a third party, the confidentiality of a group key corresponding to another DRM service can be maintained. As described below, the group key is indirectly used to decrypt encrypted content, and thus security of the encrypted content can be enhanced by securing the confidentiality of the group key corresponding to the other DRM service.

Hereinafter, the function and configuration of the PC 40 according to this embodiment are described with reference to FIG. 20.

Figure 20:
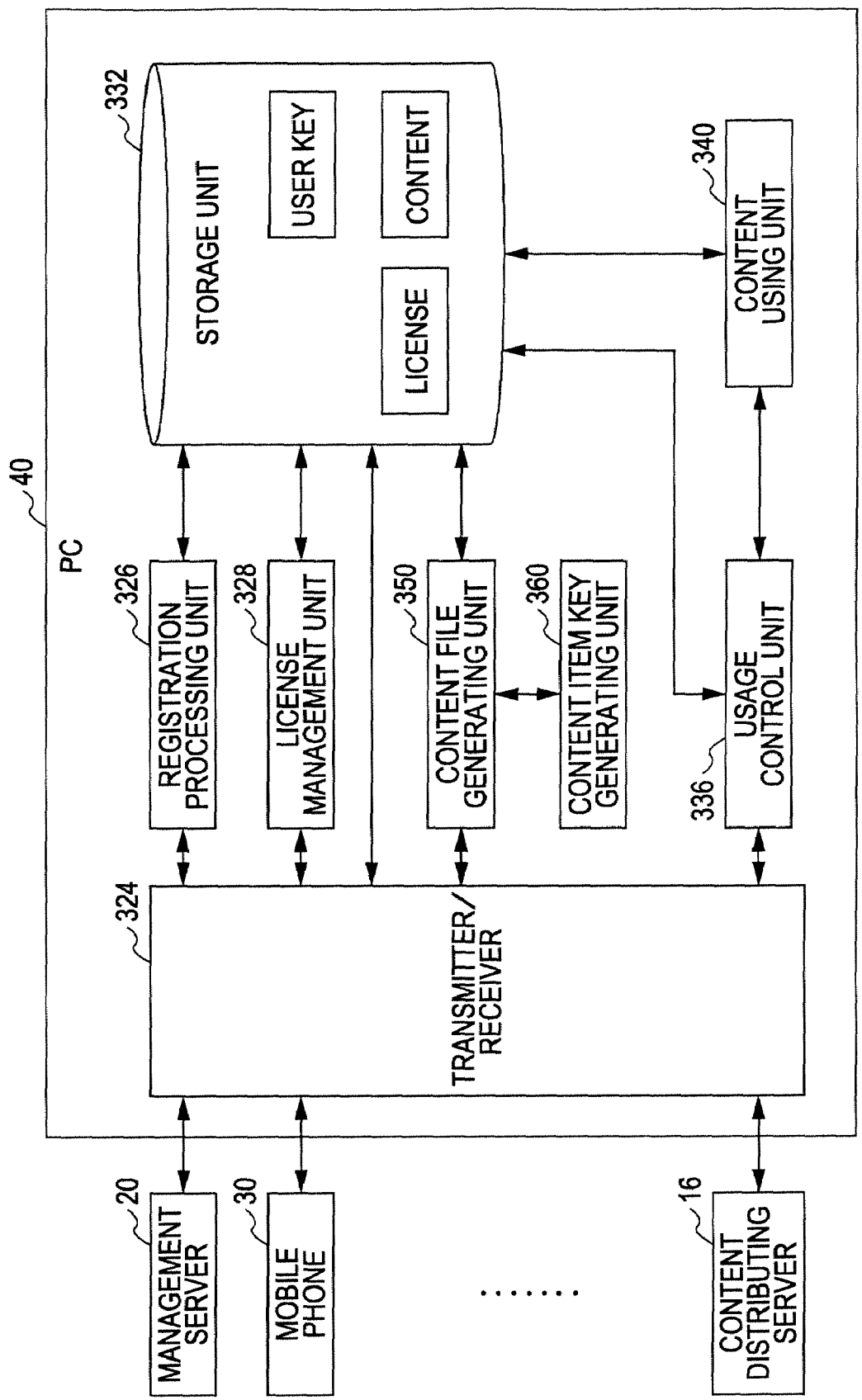
FIG. 20 is an illustration of a configuration of a PC (personal computer) according to the second embodiment.

FIG. 20 is an illustration showing the configuration of the PC 40. The PC 40 includes a transmitter/receiver 324, a registration processing unit 326, a license management unit 328, a storage unit 332, a usage control unit 336, a content using unit 340, a content file generating unit 350, and a content item key generating unit 360. The function and configuration of the PC 40 according to this embodiment are similar to those of the mobile phone 30 described above with reference to FIG. 8, and thus the difference therebetween is described below.

The license management unit 328 requests issue of a group key and a group license to the management server 20. Also, the license management unit 328 receives the group key and the group license issued by the management server 20 and allows the storage unit 332 to store the group key and the group license.

The storage unit 332 stores the group key and the group license issued by the management server 20. The group key and the group license may vary depending on a DRM service corresponding to the content to be transferred, as described above.

The content file generating unit 350 generates a content file including content and a group license to be transferred to the mobile phone 30. Hereafter, the content file and the group license are described with reference to FIGS. 21 to 23.

Figure 21:
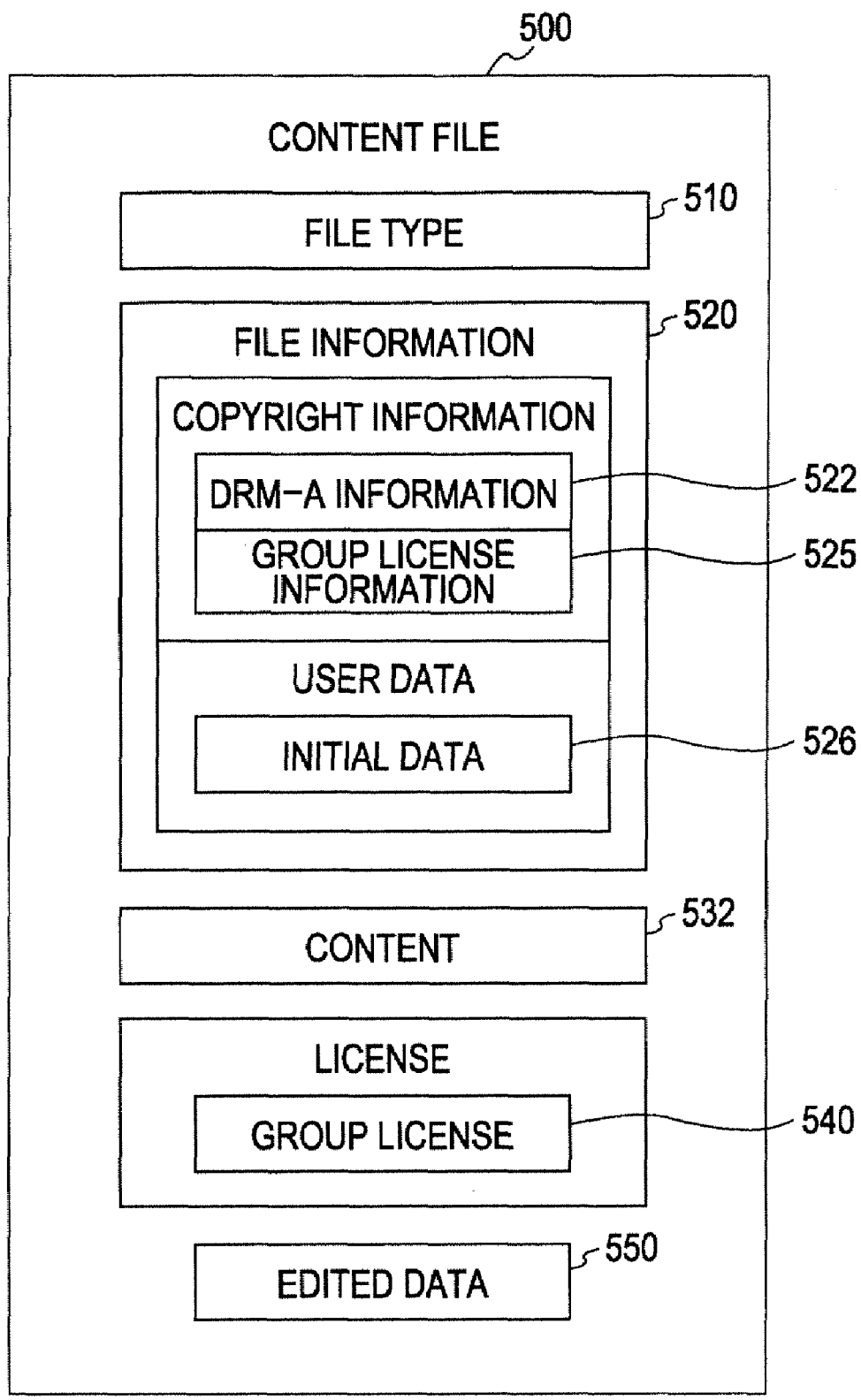
FIG. 21 is an illustration of a configuration of a content file generated by a content file generating unit according to the second embodiment.

FIG. 21 is an illustration of a configuration of a content file 500 generated by the content file generating unit 350. The content file 500 according to this embodiment is different from the content file shown in FIG. 9 in including group license information 525, content 532, and a group license 540.

The content file generating unit 350 decrypts encrypted content corresponding to DRM-C that is purchased from the existing server 80 and that is to be transferred to the mobile phone 30, encrypts the decrypted content by using a content item key, and stores the content as the content 532 in the content file 500.

Figure 22:
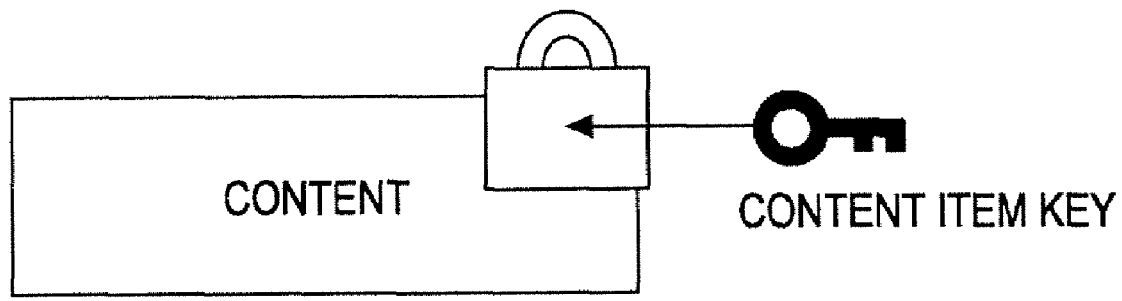
FIG. 22 is an illustration of a configuration of content according to the second embodiment.

FIG. 22 is an illustration of a configuration of the content 532. As described above, the content 532 is encrypted with the content item key. The content item key is generated by the content item key generating unit 360 by using random numbers for each piece of content to be transferred by the PC 40.

The content file generating unit 350 encrypts the content item key by using the group key issued by the management server 20, and then stores the content item key in the group license information 525 in the content file 500.

Figure 23:
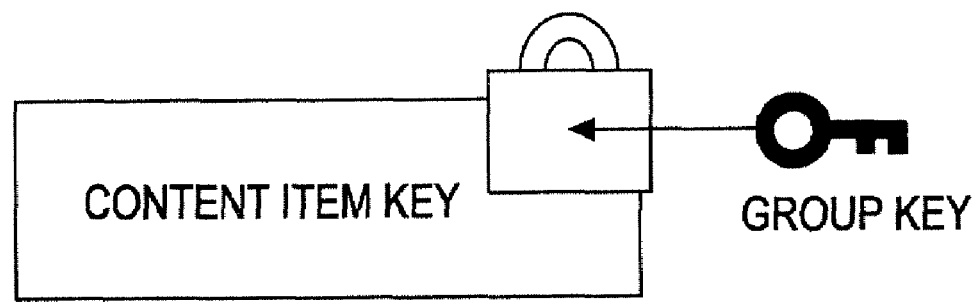
FIG. 23 is an illustration of a configuration of a content item key according to the second embodiment.

FIG. 23 is an illustration of a configuration of the content item key. As described above, the content item key is encrypted by the content file generating unit 350 by using the group key. The group key issued by the management server 20 is encrypted with a common secret key owned by the management server 20 and the PC 40 in advance, so that the group key can be decrypted by using the common secret key in the PC 40 and the decrypted group key can be used to encrypt the content item key.

As described above with reference to FIG. 18, the group license 290 includes the group key encrypted with user key A. A process of generating the above-described content file 500 is described below with reference to a flowchart.

Figure 24:
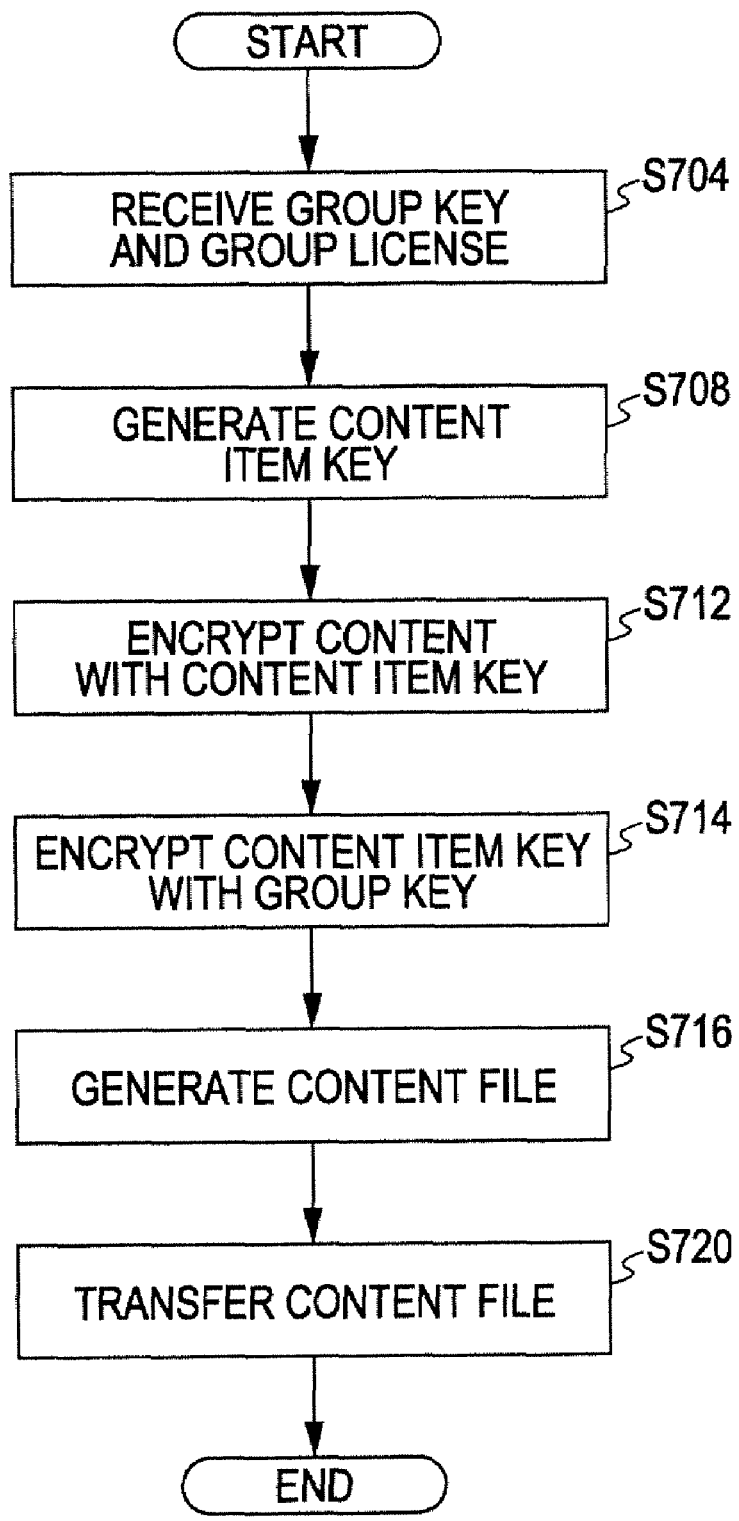
FIG. 24 is a flowchart showing a process of generating a content file performed by the PC according to the second embodiment.

FIG. 24 is a flowchart showing the process of generating the content file performed by the PC 40. The PC 40 requests issue of a group key and a group license to the management server 20 and receives the group key and the group license (step S704). Then, the PC 40 generates a content item key by using random numbers (step S708). Then, the PC 40 encrypts the content to be transferred to the mobile phone 30 with the content item key (step S712).

Then, the PC 40 encrypts the content item key with the group key (step S714), and generates a content file including the encrypted content item key, the group license, and the encrypted content (step S716).

Finally, the PC 40 transfers the content file to the mobile phone 30 (step S720). Since the content file is simply transferred, there is no restriction about a transfer method, and any of an SD card, a memory stick, a USB, and a WiFi (wireless Fidelity) may be used. In the above description, the encrypted content item key, the group license, and the encrypted content are transferred together. However, they can be separately transferred.

Figure 25:
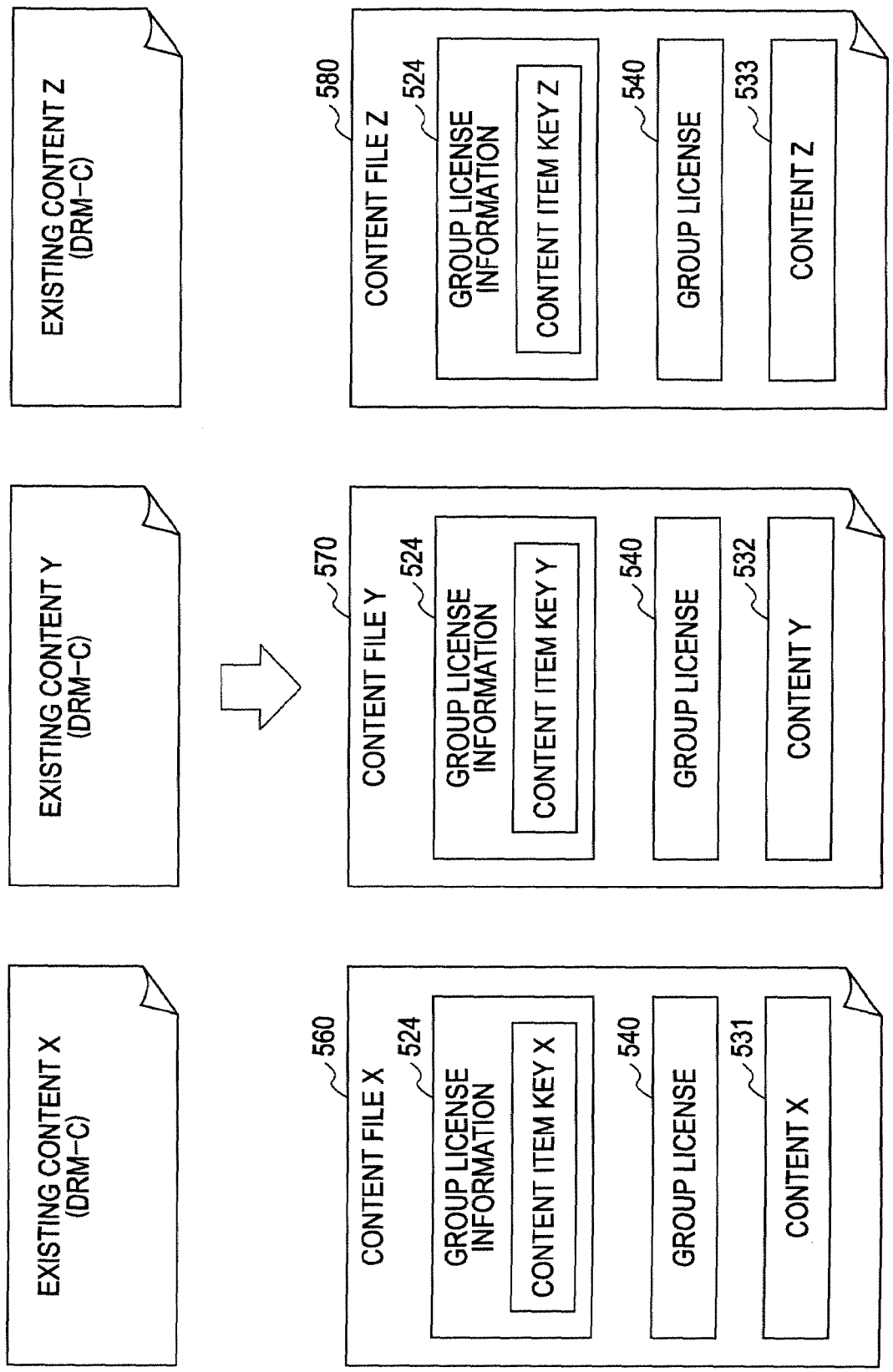
FIG. 25 is an illustration simply showing configurations of content files X, Y, and Z according to the second embodiment.

FIG. 25 is an illustration simply showing configurations of content files X, Y, and Z that are generated by the PC 40 on the basis of existing content X, Y, and Z based on DRM-C. As described above, the content item key is generated for each piece of content to be transferred, and thus the content item keys included in respective pieces of group license information 524 are different from each other.

On the other hand, the group license 540 is encrypted with user key A and thus cannot be modified in the PC 40. Accordingly, the same group license 540 is stored in each of content files X, Y, and Z.

Content X stored in content file X is the existing content X encrypted with content item key X. Content Y stored in content file Y is the existing content Y encrypted with content item key Y. Likewise, content Z stored in content file Z is the existing content Z encrypted with content item key Z.

As described above, the group key and the group license can be used for all pieces of content to be transferred if the PC 40 once accesses the management server 20 to receive the group key and the group license therefrom. On the other hand, the content item key is generated by the PC 40 for each piece of content, and thus the respective content files can be distinguished from each other.

That is, if each piece of content is encrypted with a group key without using a content item key, all pieces of content can be used with the same group key. This problem can be solved if the management server 20 issues a group key and a group license for each piece of content to be transferred from the PC 40. In this process, however, the PC 40 accesses the management server 20 every time the PC 40 transfers content, which is inconvenient.

In the content sharing method according to this embodiment, content item keys are used, so that the keys for using respective pieces of content to be transferred are distinguished from each other and that the number of times of access to the management server 20 can be suppressed.

Now, an entire process performed in the content sharing system 10 according to this embodiment is described.

Figure 26:
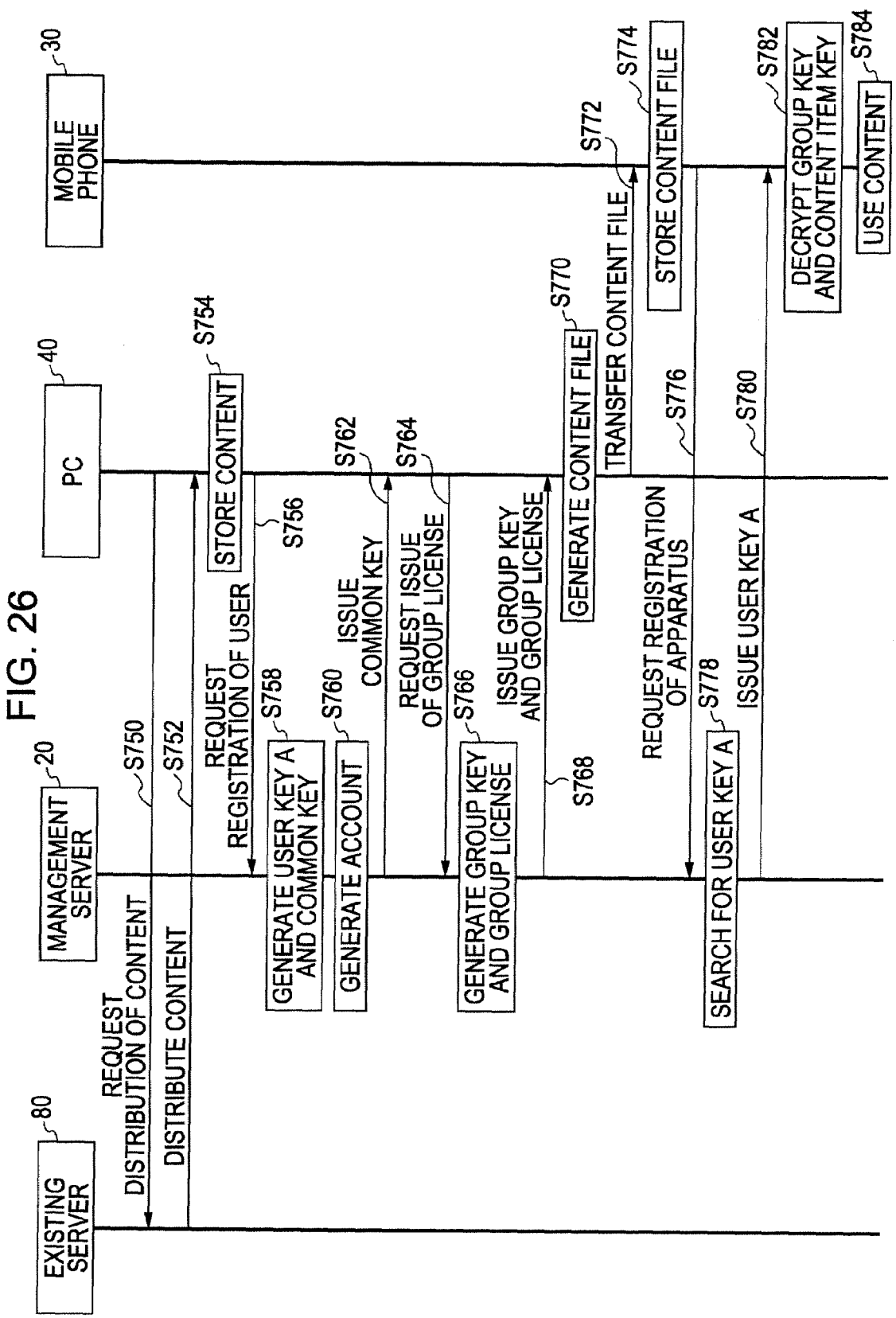
FIG. 26 is a sequence diagram showing a process performed in the content sharing system according to the second embodiment.

FIG. 26 is a sequence diagram showing the process performed in the content sharing system 10 according to this embodiment. FIG. 27 is an illustration of the process performed in the content sharing system 10 according to this embodiment.

First, the PC 40 requests distribution of content to the existing server 80 (step S750). In response to the request, the existing server 80 distributes the content to the PC 40 (step S752). The content is encrypted, and a license may be issued at the same time. The PC 40 receives the content from the existing server 80 and stores the content (step S754). Then, the PC 40 requests generation of account (registration of user) to the management server 20 (step S756). In response to the request, the management server 20 generates user key A and a common key common to the management server 20 and the PC 40 (step S758). Then, the management server 20 stores the apparatus ID of the PC 40, user key A, the common key, and the user ID while associating them with each other, so as to register the PC 40 in a group (step S760). Then, the management server 20 issues the common key to the PC 40 (step S762).

Then, the PC 40 requests issue of a group license to the management server 20 in order to transfer the content corresponding to DRM-C purchased from the existing server 80 to the mobile phone 30 (step S764). Herein, the PC 40 also transmits information about the information processing apparatus on the transferred side to the management server 20.

In response to the request from the PC 40, the management server 20 generates a group key encrypted with the common secret key common to the PC 40 and a group license including the group key encrypted with user key A generated in step S758 (step S766).

Then, the management server 20 issues the generated group key and group license to the PC 40 (step S768).

The PC 40 receives the group key and the group license from the management server 20, generates content item keys, and then generates content files for respective pieces of content by using the content item keys (step S770). Then, the PC 40 transfers the generated content files to the mobile phone 30 (step S772).

The mobile phone 30 stores the content files transferred from the PC 40 and checks the group license included in the content files (step S774). If the mobile phone 30 does not have a user key to decrypt the encrypted group key included in the group license, the mobile phone 30 requests issue of the user key, that is, requests registration of the apparatus, to the management server 20 (step S776). The mobile phone 30 transmits the user ID of the group in which the apparatus is to be registered and the apparatus ID of the mobile phone 30 to the management server 20.

The management server 20 receives the request from the mobile phone 30, searches the storage unit 236, and reads user key A generated in step S758 (step S778). Then, the management server 20 issues user key A to the mobile phone 30 (step S780).

The mobile phone 30 receives the issued user key A, decrypts the encrypted group key included in the group license with user key A, and decrypts the content item keys with the group key (step S782).

Finally, the mobile phone 30 decrypts the pieces of encrypted content by using the decrypted content item keys and use the decrypted content (step S784).

As described above, according to the content sharing system 10 of the second embodiment of the present invention, even if an information processing apparatus does not have a license corresponding to another information processing apparatus to which content is to be transferred, the content can be shared between those information processing apparatuses.

Particularly, it may be difficult to issue the composite license described in the first embodiment including licenses allowing a plurality of devices or users to share content in a server of the DRM service based on the device bind method. Therefore, the content sharing system 10 according to the second embodiment is effective in that the compatibility between the DRM service based on the user bind method and the DRM service based on the device bind method can be enhanced.

The preferred embodiments of the present invention have been described above with reference to the attached drawings, but the present invention is not limited to the above-described embodiments. It should be understood by those skilled in the art that various modifications, combinations, sub-combinations and alterations may occur depending on design requirements and other factors insofar as they are within the scope of the appended claims or the equivalents thereof.

In the above-described embodiments, a content file including encrypted content, a group license, and a content item key is transmitted/received between information processing apparatuses. Alternatively, the encrypted content, the group license, and the content item key may be transmitted/received.

The licenses included in the composite license are not limited to two types, but the composite license may include three or more types of licenses. That is, the composite license issuing unit may issue a composite license including not only license A corresponding to a first service and license B corresponding to a second service, but also license X corresponding to a third service and license Y corresponding to a fourth service.

What is claimed is:

1. A management device for providing a license to information processing devices to use encrypted content, the management device comprising:
    a registering unit that issues a first key to a first information processing device, said first key corresponding to a first digital rights management (DRM) service compatible with the first information processing device, in response to a request for registration with the first DRM service from the first information processing device, and issues a second key to a second information processing device in response to a request for registration with a second digital rights management (DRM) service from the second information processing device, said second key corresponding to the second DRM service compatible with the second information processing device, the first information processing device and the second information processing device being different types of information processing devices from each other;
    a storage device that stores an apparatus ID of the first information processing device, an apparatus ID of the second information processing device, the first key, and the second key used for the second DRM service in association with a common user ID which indicates a user that commonly owns the first information processing device and the second information processing device; and
    a composite license issuing unit that generates a composite license corresponding to the common user ID based on the first key, and the second key being stored on the storage device in association with the common user ID, and issues the composite license to the first information processing device, the composite license including a first license and a second license, the first license including first encrypted data, which is a content key to decrypt the encrypted content and that is encrypted with the first key, and the second license including second encrypted data, which is a content key to decrypt the encrypted content and that is encrypted with the second key, the first license being formatted for the first DRM service but not the second DRM service and being compatible with the first information processing device, the second license being formatted for the second DRM service and not the first DRM service and being compatible with a second information processing device.

2. The management device according to claim 1, wherein the first key is a first user key that is given to a group of one or more information processing devices corresponding to the first DRM service and owned by the user that owns the first information processing device.

3. The management device according to claim 1, wherein the first license further includes a usage condition of content encrypted with the first key, and
wherein the second license further includes a usage condition of content encrypted with the second key.

4. The management device according to claim 1, wherein, if the composite license issuing unit changes a usage condition of the first license included in the composite license, the composite license issuing unit also changes a usage condition of the second license in accordance with the change to the usage condition for the first license.

5. The management device according to claim 1, further comprising:
    a group license issuing unit that issues a group key and a group license, the group key being used to transfer encrypted content, that is stored in the first information processing device and that is based on a specific service corresponding to the first information processing device, to the second information processing device, in response to a request from the second information processing device, and the group license including the group key encrypted so as to be decrypted in the second information processing device.

6. The management device according to claim 5, wherein the group key and the group license are issued for each service corresponding to content.

7. An information processing system comprising:
a first information processing device;
a second information processing device, wherein the first information processing device and the second information processing device are different types of information processing devices from each other; and
a management device,
wherein the management device comprises:
    a registering unit that issues a first key to a first information processing device, said first key corresponding to a first digital rights management (DRM) service compatible with the first information processing device, in response to a request for registration with the first DRM service from the first information processing device, and issues a second key to a second information processing device in response to a request for registration with a second DRM service from the second information processing device, said second key corresponding to the second DRM service compatible with the second information processing device, the first information processing device and the second information processing device being different types of information processing devices from each other;
    a storage device that stores an apparatus ID of the first information processing device, an apparatus ID of the second information processing device, the first key, and the second key used for the second DRM service in association with a common user ID which indicates a user that commonly owns the first information processing device and the second information processing device; and a composite license issuing unit provided by the processor and configured to generate a composite license corresponding to the common user ID based on the first key, and the second key being stored on the storage device in association with the common user ID, and to issue the composite license to the first information processing device, the composite license including a first license and a second license, the first license including first encrypted data, which is a content key to decrypt the encrypted content and that is encrypted with the first key, and the second license including second encrypted data, which is a content key to decrypt the encrypted content and that is encrypted with the second key, the first license being formatted for the first DRM service but not the second DRM service and being compatible with the first information processing device, the second license being formatted for the second DRM service and not the first DRM service and being compatible with a second information processing device, and the first information processing device comprising:
  a storage device that stores the first key issued by a management device;
  a receiver that receives the composite license from the management device; and
  a content using unit that decrypts the encrypted content with the content key included in the first license included in the composite license stored in the storage device of the first information processing device, and to use the decrypted content.

8. The information processing system according to claim 7, the first information processing device further comprising:
  a usage control unit that determines whether the composite license stored in the storage device of the first information processing device includes the first license.

9. The information processing system according to claim 7, wherein the storage device of the first information processing device stores a group key and a group license, the group key being used to transfer content of a specific service stored in the storage device of the first information processing device to the second information processing device, and the group license including the group key encrypted so as to be decrypted in the second information processing device,
the first information processing device further comprising:
  an encrypting unit that encrypts each piece of the content of the specific service with a predetermined content item key and encrypt the content item key with the group key; and
  a transferring unit that transfers the encrypted content, the content item key, and the group license.

10. The information processing system according to claim 9,
wherein the storage device of the first information processing device stores encrypted content, a content item key, and a group license transferred from another information processing device,
the first information processing device further comprising:
  a usage control unit that determines whether the content item key transferred from the another information processing device can be used on the basis of whether the group license transferred from the another information processing device includes a group key that can be decrypted with the first key.

11. A management method implemented on a management device for providing a license to information processing devices to use encrypted content; the management method comprising:
  issuing, by a registering unit of the management device, a first key to a first information processing device, said first key corresponding to a first digital rights management (DRM) service compatible with the first information processing device, in response to a request for registration with the first DRM service from the first information processing device, and issuing a second key to a second information processing device in response to a request for registration with a second DRM service from the second information processing device, said second key corresponding to the second DRM service which is compatible with the second information processing device, the first information processing device and the second information processing device being different types of information processing devices from each other;
  storing, at a storage device of the management device, an apparatus ID of the first information processing device, an apparatus ID of the second information processing device, the first key, and the second key in association with a common user ID which indicates a user that commonly owns the first information processing device and the second information processing device; and
  generating, by a composite license issuing unit of the management device, a composite license corresponding to the common user ID based on the first key, and the second key being stored on the storage device in association with the common user ID, and issuing the composite license to the first information processing device, the composite license including a first license and a second license, the first license including first encrypted data, which is a content key to decrypt the encrypted content and that is encrypted with the first key, and the second license including second encrypted data, which is a content key to decrypt the encrypted content and that is encrypted with the second key, the first license being formatted for the first DRM service but not the second DRM service and being compatible with the first information processing device, the second license being formatted for the second DRM service and not the first DRM service and being compatible with a second information processing device.

12. An information processing method implemented on an information processing system which includes a first information processing device, a second information processing device, and a management device, wherein the first information processing device and the second information processing device are different types of information processing devices from each other, the method comprising:
  issuing, by a registering unit of the management device, a first key to a first information processing device, said first key corresponding to a first digital rights management (DRM) service compatible with the first information processing device, in response to a request for registration with the first DRM service from the first information processing device, and issuing a second key to a second information processing device in response to a request for registration with a second DRM service from the second information processing device, said second key corresponding to the second DRM service which is compatible with the second information processing device, the first information processing device and the second information processing device being different types of information processing devices from each other;

storing, at a storage device of the management device, an apparatus ID of the first information processing device, an apparatus ID of the second information processing device, the first key, and the second key in association with a common user ID which indicates a user that commonly owns the first information processing device and the second information processing device;

generating by a composite license issuing unit of the management device, a composite license corresponding to the common user ID based on the first key, and the second key being stored on the storage device in association with the common user ID, and issuing the composite license to the first information processing device, the composite license including a first license and a second license, the first license including first encrypted data, which is a content key to decrypt the encrypted content and that is encrypted with the first key, and the second license including second encrypted data, which is a content key to decrypt the encrypted content and that is encrypted with the second key, the first license being formatted for the first DRM service but not the second DRM service and being compatible with the first information processing device, the second license being formatted for the second DRM service and not the first service and being compatible with a second information processing device;

storing, in a storage device of the first information processing device, the first key issued by the management device;

receiving, by a receiver of the first information processing device, the composite license from the management device; and decrypting, by a content using unit of the first information processing device, the encrypted content with the content key included in the first license included in the composite license stored in the storage device of the first information processing device, and using the decrypted content.

13. A management device for providing a license to an information processing device to use encrypted content, the management device comprising:

registering means for issuing a first key to a first information processing device, said first key corresponding to a first digital rights management (DRM) service compatible with the first information processing device, in response to a request for registration with the first DRM service from the first information processing device, and for issuing a second key to a second information processing device in response to a request for registration with a second DRM service from the second information processing device, said second key corresponding to the second DRM service compatible with the second information processing device, the first information processing device and the second information processing device being different types of information processing devices from each other;

storage means for storing an apparatus ID of the first information processing device, an apparatus ID of the second information processing device, the first key, and the second key with a common user ID which indicates a user that commonly owns the first information processing device and the second information processing device; and composite license issuing means for generating a composite license corresponding to the common user ID based on the first key, and the second key being stored in the storing means in association with the common user ID, and for issuing the composite license to the first information processing device, the composite license including a first license and a second license, the first license including first encrypted data, which is a content key to decrypt the encrypted content and that is encrypted with the first key, and the second license including second encrypted data, which is a content key to decrypt the encrypted content and that is encrypted with the second key, the first license being formatted for the first DRM service but not the second service and being compatible with the first information processing device, the second license being formatted for the second DRM service and not the first service and being compatible with a second information processing device.

14. An information processing system comprising:
a first information processing device;
a second information processing device, wherein the first information processing device and the second information processing device are different types of information processing devices from each other; and
a management device,
wherein the management device comprises:

registering means for issuing a first key to a first information processing device, said first key corresponding to a first digital rights management (DRM) service compatible with the first information processing device, in response to a request for registration with the first DRM service from the first information processing device, and for issuing a second key to a second information processing device in response to a request for registration with a second DRM service from the second information processing device, said second key corresponding to the second DRM service compatible with the second information processing device, the first information processing device and the second information processing device being different types of information processing devices from each other;

storage means for storing an apparatus ID of the first information processing device, an apparatus ID of the second information processing device, the first key, and the second key with a common user ID which indicates a user that commonly owns the first information processing device and the second information processing device; and composite license issuing means for generating a composite license corresponding to the common user ID based on the first key, and the second key being stored in the storing means in association with the common user ID, and for issuing the composite license to the first information processing device, the composite license including a first license and a second license, the first license including first encrypted data, which is a content key to decrypt the encrypted content and that is encrypted with the first key, and the second license including second encrypted data, which is a content key to decrypt the encrypted content and that is encrypted with the second key, the first license being formatted for the first DRM service but not the second service and being compatible with the first information processing device, the second license being formatted for the second DRM service and not the first DRM service and being compatible with a second information processing device the first information processing device comprising:

storage means for storing the first key issued by a management device;

receiving means for receiving the composite license from the management device; and content using means for decrypting the encrypted content with the content key included in the first license included in the composite license stored in the storage means of the first information processing device, and for using the decrypted content.

15. The management device according to claim 1, wherein the first information processing device is a mobile phone and the second information processing device is a personal computer.

16. The management device according to claim 1, wherein the first DRM service is open mobile alliance (OMA) and the second DRM service is Marlin.

* * * * *